US012525723B2

(12) United States Patent
Fernandez et al.

(10) Patent No.: US 12,525,723 B2
(45) Date of Patent: Jan. 13, 2026

(54) DEPLOYABLE ANTENNA REFLECTORS ARRAY FORMED OF MULTIPLE CONNECTED GORES

(71) Applicant: United States of America as represented by the Administrator of NASA, Washington, DC (US)

(72) Inventors: Juan M. Fernandez, Norfolk, VA (US); Andrew F. Paddock, Newport News, VA (US); Kevin DeMarco, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 116 days.

(21) Appl. No.: 18/606,292

(22) Filed: Mar. 15, 2024

(65) Prior Publication Data

US 2024/0313415 A1 Sep. 19, 2024

Related U.S. Application Data

(60) Provisional application No. 63/452,712, filed on Mar. 17, 2023, provisional application No. 63/452,713, filed on Mar. 17, 2023.

(51) Int. Cl.

| | |
|---|---|
| ***H01Q 15/20*** | (2006.01) |
| ***H01Q 1/28*** | (2006.01) |
| ***H01Q 15/14*** | (2006.01) |
| ***H01Q 15/16*** | (2006.01) |

(52) U.S. Cl.
CPC ............ *H01Q 15/20* (2013.01); *H01Q 1/288* (2013.01); *H01Q 15/148* (2013.01); *H01Q 15/16* (2013.01)

(58) Field of Classification Search
None
See application file for complete search history.

(56) References Cited

U.S. PATENT DOCUMENTS

| | | | |
|---|---|---|---|
| 2,234,993 | A | 3/1941 | Vernon et al. |
| 3,174,851 | A | 3/1965 | Buehler |

(Continued)

FOREIGN PATENT DOCUMENTS

| | | |
|---|---|---|
| EP | 1501424 B1 | 6/2018 |
| JP | 4741230 | 8/2011 |

(Continued)

OTHER PUBLICATIONS

Annette M. Schmidt, "The Synthesis of Magnetic Core-Shell Nanoparticles by Surface-Initiated Ring-Opening Polymerization of ε-Caprolactone," Macromolecular Rapid Communications, 2005, pp. 93-97, vol. 26.

(Continued)

*Primary Examiner* — Wilson Lee
(74) *Attorney, Agent, or Firm* — M. Bruce Harper; Trenton J. Roche; Robin W. Edwards

(57) ABSTRACT

Antenna reflectors having a diameter of 10 or more meters include dimensionally and thermally stable deformable composite reflective material that enables efficient packaging of solid surface segmented reflectors and a folding scheme and architecture that enables self-deployment to support S-band and above RF (≥2 GHz) transmissions.

20 Claims, 28 Drawing Sheets

(56) References Cited

U.S. PATENT DOCUMENTS

| | | | | |
|---|---|---|---|---|
| 5,440,320 | A * | 8/1995 | Lach | H01Q 15/147 343/915 |
| 5,863,988 | A | 1/1999 | Hashimoto et al. | |
| 6,300,464 | B2 | 10/2001 | Morijiri et al. | |
| 6,344,835 | B1 | 2/2002 | Allen et al. | |
| 7,710,348 | B2 | 5/2010 | Taylor et al. | |
| 7,743,835 | B2 | 6/2010 | Willauer | |
| 7,832,490 | B2 | 11/2010 | Willauer | |
| 8,198,349 | B2 | 6/2012 | Xiao et al. | |
| 8,618,238 | B2 | 12/2013 | Xie et al. | |
| 8,685,528 | B2 | 4/2014 | Xie et al. | |
| 9,117,568 | B2 | 8/2015 | Scheffer et al. | |
| 9,796,159 | B2 | 10/2017 | Kang et al. | |
| 10,347,974 | B1 * | 7/2019 | Palmer | H01Q 1/288 |
| 11,267,224 | B2 | 3/2022 | Kang et al. | |
| 12,166,297 | B1 * | 12/2024 | Tianang | H01Q 15/16 |
| 2004/0265755 | A1 | 12/2004 | Park et al. | |
| 2005/0154090 | A1 | 7/2005 | Salvino | |
| 2006/0142472 | A1 | 6/2006 | Hirai et al. | |
| 2008/0213490 | A1 | 9/2008 | Strange | |
| 2008/0262188 | A1 | 10/2008 | Xie et al. | |
| 2009/0130391 | A1 | 5/2009 | Taya | |
| 2009/0280330 | A1 | 11/2009 | Xie et al. | |
| 2010/0028686 | A1 | 2/2010 | Xie | |
| 2010/0125113 | A1 | 5/2010 | Xiao et al. | |
| 2010/0190011 | A1 | 7/2010 | Cheng et al. | |
| 2011/0086206 | A1 | 4/2011 | Scheffer et al. | |
| 2011/0088931 | A1 | 4/2011 | Lettow et al. | |
| 2017/0158357 | A1 * | 6/2017 | Hart, III | B64G 1/66 |
| 2024/0066828 | A1 | 2/2024 | Kang et al. | |
| 2024/0313418 | A1 * | 9/2024 | Fernandez | H01Q 15/161 |
| 2025/0007154 | A1 * | 1/2025 | Sun | H01Q 3/247 |
| 2025/0105527 | A1 * | 3/2025 | Rossanese | H01Q 3/46 |

FOREIGN PATENT DOCUMENTS

| | | |
|---|---|---|
| JP | 5449779 | 3/2014 |
| KR | 1020040076512 | 3/2010 |
| WO | WO2003088818 | 10/2003 |
| WO | WO2007070877 | 6/2007 |

OTHER PUBLICATIONS

Craig L. Streett, et al., "Aerodynamic Noise Reduction for High-Lift Devices on a Swept Wing Model," 44th AAIA Aerospace Sciences Meeting and Exhibit, Jan. 9-12, 2006, pp. 1-26, Reno, Nevada.

Duerig et al., Designing With the Shape Memory Effect. MRS, vol. 9, pp. 581-597 1989.

Hilmar Koerner, et al., "Remotely Actuated Polymer Nanocomposites-Stress-Recovery of Carbon-Nanotube-Filled Thermoplastic Elastomers," Nature Materials, 2004, pp. 115-120, vol. 3.

Hissaaki Tobushi, et al., "Thermomechanical Properties in a Thin Film of Shape Memory Polymer of Polyurethane Series," Smart Mater. Struct., 1996, pp. 483-491, vol. 5, IOP Publishing Ltd., United Kingdom.

Jae Whan Cho, et al., "Electroactive Shape-Memory Polyurethane Composites Incorporating Carbon Nanotubes," Macromolecular Rapid Communications, 2005. pp. 412-416, vol. 26.

Kim et al., Graphene/Polymer Nanocomposites, Macromolecules 2010, 43, 6515-6530. Jul. 23, 2010. http://pubs acs.org/doi/pdf/10.1021/ma100572e.

Momentive: RapidStrength RGS7700 Structural silicone elastomeric adhesive. Sep. 2008. http://www.siliconeforbuilding.com/pdf/glazing/Data-Sheet-RGS7700-RapidStrength-Structural.pdf.

PubChem: Bisphenol A diglycidyl ether. Retrieved on Feb. 4, 2015.

Richard Lin, Shape Memory Alloys and Their Applications (Lin), Feb. 22, 2008. http://web.stanford.edu/richlin1/sma/sma.html.

Takeru Ohki, et al., "Mechanical and Shape Memory Behavior of Composites with Shape Memory Polymer," Composites Part A: applied science and manufacturing, 2004, pp. 1065-1073, vol. 35.

Taro Imamura, et al., "Designing of Slat Cove Filler as a Noise Reduction Device for Leading-edge Slat," AIAA Paper 2007-3473, 2007, pp. 1-17.

Y. Liu, et al., "Thermomechanics of Shape Memory Polymer Nanocomposites," Mechanics of Materials, 2004, pp. 929-940, vol. 36.

Zhong et al., "Graphitic Carbon Nanofiber (GCNF)/Polymer Materials. II. GCNF/Epoxy Monoliths Using Reactive Oxydianiline Linker Molecules and the Effect of Nanofiber Reinforcement on Curing Conditions". Polymer Compositesvol. 26, Issue 2, Jan. 13, 2005.

Zhang, J.; Xu, S.; Li, W. High Shear Mixers: A Review of Typical Applications and Studies on Power Draw, Flow Pattern, Energy Dissipation and Transfer Properties. Chemical Engineering and Processing: Process Intensification 2012, 57-58, 25-41.

Ken Gall et al., Carbon Fiber Reinforced Shape Memory Polymer Composites, Journal of Intelligent Material Systems and Structures, vol. 11—Nov. 2000.

Yao Yao et al., Ultra-Thin, Ultra-Lightweight, and Multifunctional Skin for Highly Deformable Structures AIAA SciTech Forum Jan. 7-11, 2019, San Diego, California.

Yao Yao et al., Ultra-thin, Flexible Electronics for Measurements of Tape-Spring Hinge Behavior, AIAA SciTech Forum Jan. 11-15 & 19-21, 2021.

Andrei Zagrai et al., Structural Health Monitoring During Suborbital Space Flight, 66th International Astronautical Congress, Jerusalem, Israel. Copyright © 2015.

Suraj Rawal, Materials and Structures Technology insertion into Spacecraft Systems: Successes and Challenges, 68th International Astronautical Congress (IAC), Adelaide, Australia, Sep. 25-29, 2017.

Kang et al, A Study of Shape Memory Polymer Based Slat-Cove Filler, NASA/TM-2018-219804.

Juan M. Fernandez et al., Segmented Hexagonal Antenna Reflector Concentrically Stacked Using Shape Memory Composite Tubular Hinges, 41st ESA Antenna Workshop on Large Deployable Antennas, Sep. 25-28, 2023 at ESA-ESTEC in Noordwijk, The Netherlands.

M. Toral, G. Heckler, P. Pogorelo, N. George, K. Han, "Payload performance of third generation TDRS and future services," AIAA International Communications Satellite Systems Conference (ICSSC), 2017.

J. Footdale, J. Cody Griffe, M. E. Peterson, and C. Box, "Flexible composite shell design for the MARCO deployable reflector," AIAA Scitech 2019 Forum, Jan. 7-11, 2019, San Diego, CA.

P. N. Keller, M. S. Lake, D. Codell, R. Barrett, R. Taylor, M. R. Schultz., "Development of elastic memory composite stiffeners for a flexible precision reflector," 47th AIAA/ASME/ASCE/AHS Structures, Structural Dynamics, and Materials Conference, May 1-4, 2006, Newport, RD.

Jonathan Sauder, Starburst: A Concept for a New Deployable Structure Architecture, AIAA SciTech Forum Jan. 8-12, 2024, Orlando, FL.

Will Francis, Development of an EMC Self-Locking Linear Actuator for Deployable Optics, 45th AIAA/ASME/ASCE/AHS/ASC Structures, Structural Dynamics & Materials Conference Apr. 19-22, 2004, Palm Springs, California.

M. M. Mikulas Jr., P. R. Withnell, "Construction concepts for precision segmented reflectors," AIAA Paper 93-1461, 1993.

Juan M. Fernandez et al., Segmented, Pleat-Folded and Rib-Supported Thin-Shell Composite Antenna Reflector, 41st ESA Antenna Workshop on Large Deployable Antennas, Sep. 25-28, 2023 at ESA-ESTEC in Noordwijk, The Netherlands.

M. M. Mikulas Jr., T. J. Collins, J. M. Hedgepeth, "Preliminary design approach for large high precision segmented reflectors," NASA Technical Memorandum 102605, 1990.

Y. She, S. Li, Z. Wang, "Constructing a large antenna reflector via spacecraft formation flying and reconfiguration control," AIAA Journal of Guidance, Control, and Dynamics, vol. 42, No. 6, Jun. 2019.

NASA, https://www.nasa.gov/press-release/nasa-funds-demonstration-of-assembly-and-manufacturing-in-space, published Jan. 31, 2020.

(56) References Cited

OTHER PUBLICATIONS

H. M. Y. C. Mallikarachchi, S. Pellegrino, "Optimized design of composite booms with integrated tape-spring hinges," AIAA 2010-2750.
D. S. Adams, M. Mobrem, "Lenticular jointed antenna deployment anomaly and resolution onboard the Mars Express spacecraft," AIAA Journal of Spacecraft and Rockets, vol. 46, No. 2, pp. 403-410, Mar.-Apr. 2009.
Lunark A Moon Habitat Analog, Saga Space Architects, Jul. 27, 2023 (retrieved from the internet: Jul. 27, 2023, p. 1-8.
Pehron, Nathan et al., "TRAC-Spring Guided Hinges," conference paper, AIA Scitech 2022 Forum, Jan. 2022, pp. 1-21.
Melancon, David et al., "Multistable inflatable origami structrues at the metre scale," Nature, Apr. 22, 2021, pp. 540-550 and Supplementary pp. 1-31, vol. 592.
Leah Burrows, "Bistable Pop-Up Structures Inspired by Origami: Next Generation Inflatable Buildings Maintain Their Shape without constant Input of Pressure," Multimedia, Research, Apr. 21, 2021, pp. 1-5.

* cited by examiner

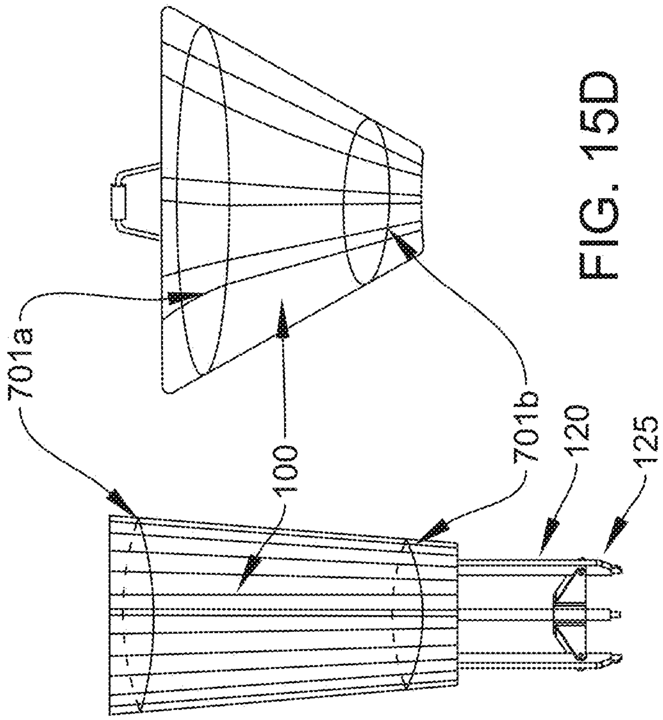
FIG. 15D
FIG. 15B
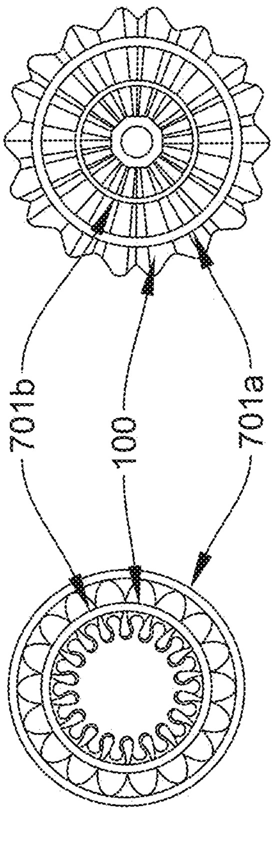
FIG. 15C
FIG. 15A

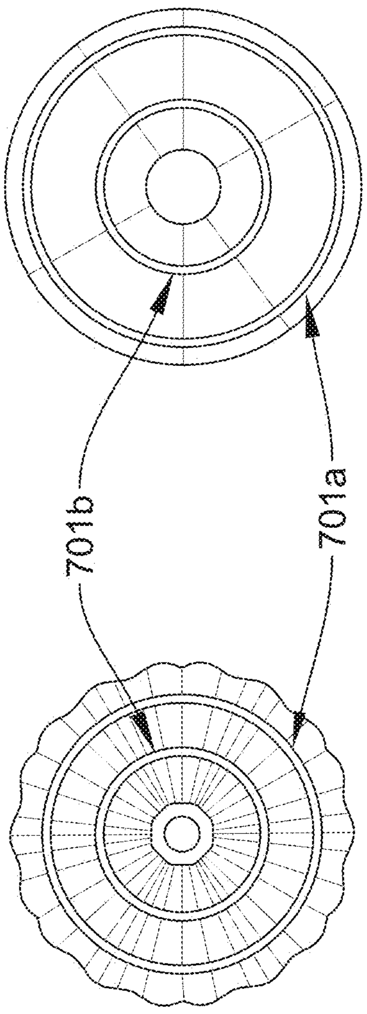
FIG. 15E
FIG. 15G
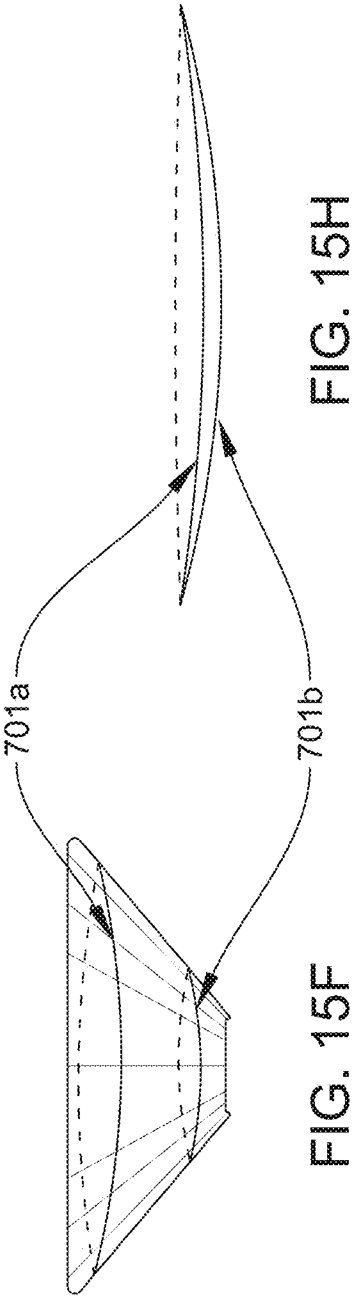
FIG. 15F
FIG. 15H

DEPLOYABLE ANTENNA REFLECTORS ARRAY FORMED OF MULTIPLE CONNECTED GORES

CROSS-REFERENCE TO RELATED PATENT APPLICATION(S)

This patent application claims the benefit of and priority to U.S. Provisional Application No. 63/452,712, filed on Mar. 17, 2023 entitled Shape Memory Polymer Composite Substrate and priority to U.S. Provisional Application No. 63/452,713 filed on Mar. 17, 2023, the contents of which are hereby incorporated by reference in their entirety.

The patent application also cross-references commonly owned U.S. Pat. No. 9,796,159 entitled Electric Field Activated Shape Memory Polymer Composite; U.S. Pat. No. 11,267,224 entitled Method for Preparing and Electrically-Activated Shape Memory Polymer Composite; and U.S. patent application Ser. No. 18/238,137 entitled Composite Deployable Structure; U.S. Provisional Application No. 63/401,394, filed on Aug. 26, 2022; U.S. Provisional Application No. 63/452,752, filed on Mar. 17, 2023; U.S. Provisional Application No. 63/455,468, filed on Mar. 29, 2023; and U.S. patent application Ser. No. 18/605,929 entitled SHAPE MEMORY POLYMER COMPOSITE SUBSTRATE, each of which is incorporated herein by reference in its entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE EMBODIMENTS

Antennas are the cornerstone of high data rate communications and transmission for Earth missions and deep-space communications, both from space and from moon/planetary surfaces. Deploying operational antennas into space in an efficient manner remains a challenge. In order to meet the increasing demand for high-throughput satellited (HTS) antennas that can operate at higher frequencies, larger reflector configurations are required.

Conventional, fixed, solid surface antenna radiofrequency (RF) reflectors up to 4 meters limitation is normally due to the minimal accuracy requirement of the reflective surface. Deployable versions with rigid panels up to 10 meters in diameter have been explored, but present mechanical complexities to stow/deploy due to volume and mass.

Deformable versions using thin-shell composite reflective surface construction, such as that described in U.S. Pat. No. 7,710,348, are possible but have size limitations, e.g., less than 10 m diameter, due to surface accuracy requiring deep backbones or perimeter ring structures to scale up.

There remains a need for improved materials, configurations and processes for efficiently establishing antenna reflectors of varying sizes in space. More particularly, there is a need for dimensionally and thermally stable deformable composite reflective material that enables efficient packaging of solid surface segmented reflectors and a folding scheme and architecture that enables self-deployment of at least 10-m reflectors to support S-band and above RF (≥2 GHZ).

BRIEF SUMMARY OF THE EMBODIMENTS

In a first exemplary embodiment, an antenna reflector array having at least a deployed position and a stowed position includes: a thin-shell elastic surface including multiple flexible radial gores discretely connected circumferentially to form a surface of revolution reflective surface on a first side thereof in the first deployed position, wherein each of the multiple flexible gores is connected to two other of the multiple flexible gores at edges thereof by two or more thin-shell gore-to-gore connectors, further wherein the gore-to-gore connectors are located on a non-reflective side of each flexible gore; a backbone structure comprising multiple rigid arms for supporting the multiple connected, flexible gores, wherein each of the multiple flexible gores is attached to one of the multiple rigid arms on a non-reflective side thereof by discrete flexible connectors; and a deployment mechanism for changing the array between the deployed and stowed positions, the deployment mechanism including multiple rigid arms and a central circular hub, each of the multiple rigid arms including a hinge at one end thereof, the hinge being further connected to the central circular hub; wherein in the stowed position, each of the multiple flexible gores assumes a serpentine shape having at least one or more lobes.

In a second exemplary embodiment, an antenna reflector array having at least a deployed position and a stowed position includes: a thin-shell elastic surface including multiple flexible radial gores discretely connected circumferentially to form a surface of revolution reflective surface on a first side thereof in the first deployed position, wherein the surface is formed of two separate concentric gore rings comprised of multiple flexible connected gores and further wherein a first gore ring has a first inner diameter and a first outer diameter and a second gore ring has a second inner diameter and second outer diameter and further wherein the first inner diameter is the smallest diameter of the circular reflective surface and the second outer diameter is the largest diameter of the circular reflective surface; a backbone structure for supporting the multiple connected, flexible gores in each gore ring, wherein each of the multiple flexible gores in the first gore ring is attached to one of the first multiple rigid arms on a non-reflective side thereof by discrete flexible connectors, each of the first multiple rigid arms including a first hinge at a first end thereof, the first hinge being further connected to the central circular hub and a second hinge at a second end thereof, and further wherein each of the multiple flexible gores in the second gore ring is attached to one of the second multiple rigid arms on a non-reflective side thereof by discrete flexible connectors, each of the second multiple rigid arms being further connected to the second hinge of a first multiple rigid arm of a flexible gore in the first gore ring; and a deployment mechanism for changing the array between the deployed and stowed positions, the deployment mechanism including multiple first rigid arms, multiple second rigid arms and a central circular hub, wherein in the stowed position, each of the multiple flexible gores assumes a serpentine shape having at least one or more lobes.

In a third exemplary embodiment, a system for stowing a deployed antenna reflector array includes: a first circular central hub having multiple first pushrods connected thereto and second circular central hub having multiple second pushrods connected thereto, wherein each of the multiple first pushrods is mechanically connected to one of the multiple second pushrods; further wherein, the first circular central hub, the multiple first push rods and the multiple second push rods are located on a reflective side of a surface of revolution reflective surface of an array of multiple connected flexible radial gores and the second circular hub is located on an opposite side of the surface the array; and the second circular central hub further being connected to multiple third pushrods at first ends thereof, wherein each of the multiple third pushrods is connected to the multiple second pushrods by links at second ends thereof; the first, second and third pushrods and links being capable of folding the deployed antenna array for stowing into a substantially cylindrical configuration with the multiple flexible connected gores each forming a serpentine shape with one or more lobes.

These and other features, advantages, and objects of the present embodiments will be further understood and appreciated by those skilled in the art by reference to the following specification, claims, and appended drawings.

BRIEF DESCRIPTION OF THE SEVERAL VIEWS OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIGS. 1*a* and 1*b* illustrate a first connected gore antenna reflector array in its fully deployed state wherein FIG. 1*a* is a top view, reflector side view and FIG. 1*b* is a bottom view in accordance with one or more embodiments herein;

FIGS. 15*a*, 15*b*, 15*c*, 15*d*, 15*e*, 15*f*, 15*g*, and 15*h* illustrate views of a connected gore antenna reflector array having one or more outer diameter restraining bands in accordance with one embodiment herein.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
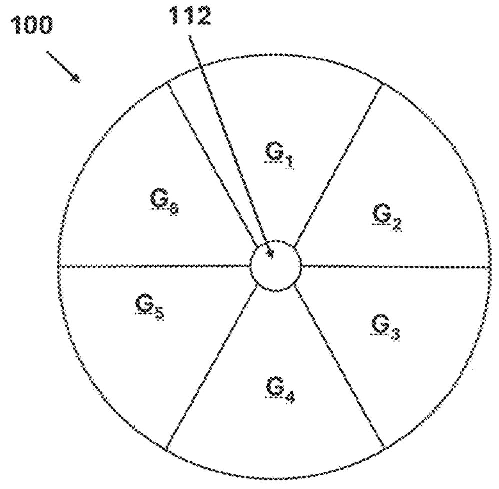

An exemplary drawing representation of a first antenna reflector array 100 in its fully deployed state is shown in FIGS. 1*a* (top view; reflector side) and 1*b* (bottom view; with support structure not shown). The FIGS. show six, 60 degree gores $G_1$, $G_2$, $G_3$, $G_4$, $G_5$, $G_6$, connected to form a generally circular or parabolic reflector. The gore and reflector diameter may vary. In a preferred embodiment, the final reflector diameter is at least 5 m. Each individual gore includes an inner 105 and outer 110 flexible tape-spring skirt. The gores are connected together by multiple flexible tape-spring hinges 115, leaving a central hole 112 in the center of the deployed reflector 100. The tape-spring skirt and tape-spring hinges are formed from a thin flexible composite laminate such as the shape memory composite ("SMC") substrate described in co-owned U.S. patent application Ser. No. 19/262,509 and U.S. Provisional Patent Application No. 63/452,712 which are incorporated herein by reference in their entirety. Components formed from SMC can be programmed into a temporary shape through applied force and heating. In the programmed shape, the deformed structure is in a frozen state remaining dormant without external constraints. Upon heating once more, the substrate will return slowly (several to tens of seconds) to the original shape. SMC components used in the present embodiments may also include one or more flexible heaters and one or more layers of heat spreading material to assist with distribution of applied heat, as well as sensors, such as strain and temperature sensors and a microprocessor for implementing a monitoring and feedback control process. The shape of the various components is controllably by an external stimulus, such as mechanical load, heat, electrical field or magnetic field.

Figure 1B:
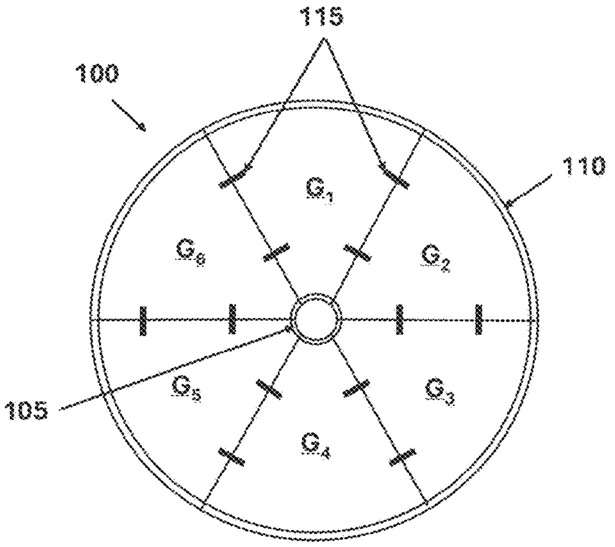
Figure 2A:
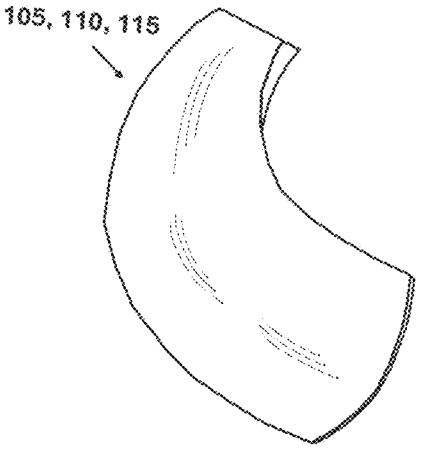
FIGS. 2*a* and 2*b* show exemplary isometric views of an inner tape spring skirt and an outer tape-spring skirt of an antenna reflector array in accordance with one or more embodiments herein.
Figure 2B:
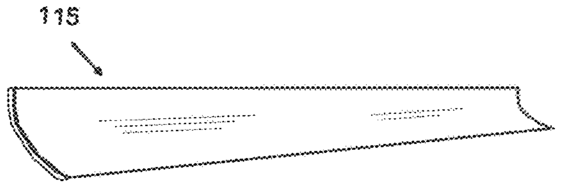

FIGS. 2*a*, 2*b* and 2*c* show exemplary isometric views of an inner tape-spring skirt 105 (FIG. 2*a*) and an outer tape-spring skirt 110 (FIG. 2*a*) which are post-bonded to the inner and outer edges of the gores, which are used to maintain reflector surface accuracy in the deployed state, and an exemplary tape-spring gore-to-gore connector 115 (FIG. 2*b*), which is used to connect adjacent gores along their radial edges. As shown in FIG. 2*a*, tape-spring skirts 105 and 110 are doubly-curved: longitudinally curved to match the inner and outer perimeter of the reflector; and transversely curved to provide out-of-plane stiffness to the deployed thin-shell reflector to maintain necessary surface accuracy. In addition, the doubly-curved skirts generate strain energy during the folding process that will be frozen via the SMC effect and used to help contain the serpentine folded reflector in the stowed state. The tape-spring gore-to-gore connector can be doubly-curved (FIG. 2*a*), single curve (FIG. 2*b*) or flat in decreasing order of deployed stiffness. The tape-spring connector 115 is post-bonded to the paraboloid shell connecting adjacent gores as shown in FIG. 1*b*. As shown in FIGS. 2*a*, 2*b* and 2*c*, the skirts and gore-to-gore connectors are in their original shapes. When the reflector array is fully deployed, the tape-spring connectors generally lay close to flat (original shape) and provide added stiffness and support to the deployed shape. The inner and outer tape-spring skirts supporting the inner and outer rim of the reflector may be in a transversely convex or concave configuration with respect to the gore outer and inner perimeters. In their programmed state, both the skirts 105, 110 and the gore-to-gore connectors 115 will adopt the local serpentine shape of the folded gore they are bonded to (see FIG. 6*e*). A separate restraint mechanism will be used to keep the reflector stowed with the help of the SMC skirts and gore-to-gore connectors reducing the natural tendency of the highly strained reflector surface to self-deploy back to the extended state. During controlled deployment of the reflector, the SMC elements will slowly change back to their original shapes after heat is applied. Further, while the inner and outer tape-spring skirts are shown as running the entire circumference of the deployed reflector, the skirts will be segmented, either by gore, e.g., running from edge to edge of each gore, or from a first gore centerline to a second gore centerline. One skilled in the art will appreciate that this may not be required, but it helps manage the fabrication of the tape-spring skirts as their required size grows. The length and width of the tape-spring gore-to-gore connectors may also vary in accordance with gore and reflector size. In an exemplary embodiment, the tape-spring connectors are approximately 10-20 cm in length.

Figure 3A:
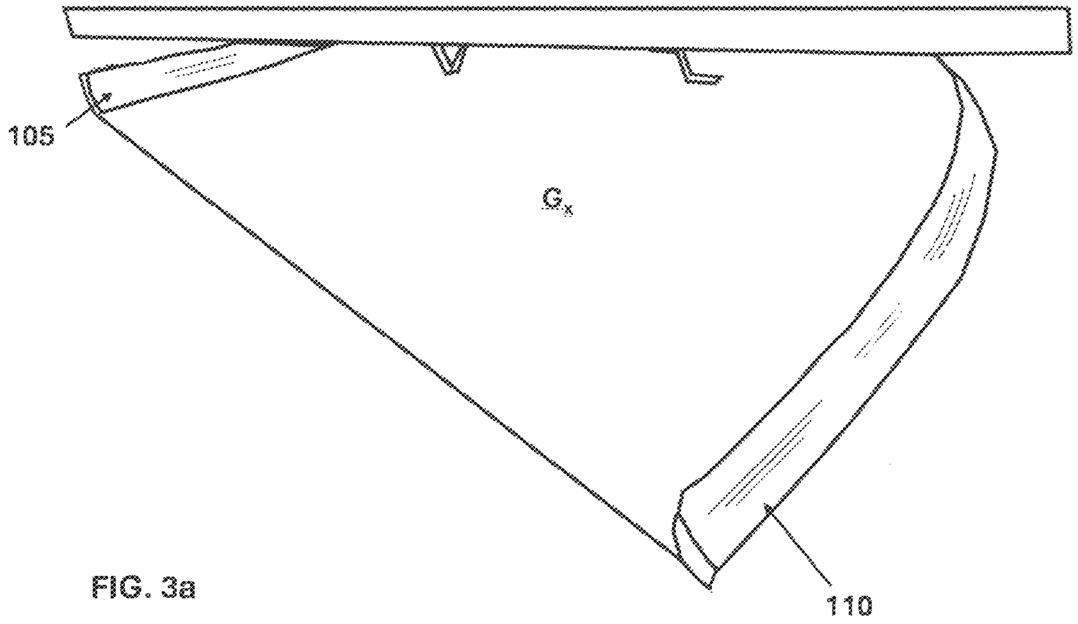
FIGS. 3*a* and 3*b* provide isometric views of an exemplary gore which may be used in an antenna reflector array in accordance with one or more embodiments herein.
Figure 3B:
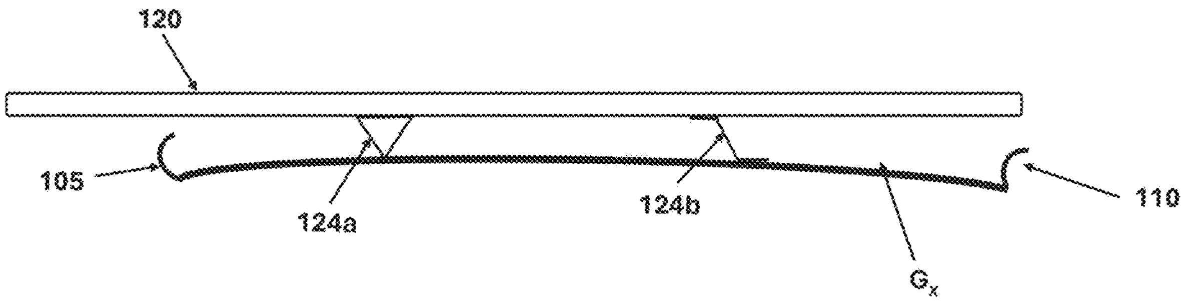

FIGS. 3*a* and 3*b* provide an isometric and side view of an exemplary gore $G_x$ including inner 105 and outer 110 skirts. Each gore has a thin-shell construction using High Strain Composite (HSC) materials. For example, an elastic material such as a thin-ply carbon fiber reinforced polymer (CFRP) having up to 8 plies may be used. Also shown are rigid support arm 120 and gore-to-backbone connectors 124*a* and 124*b*.

Figure 4A:
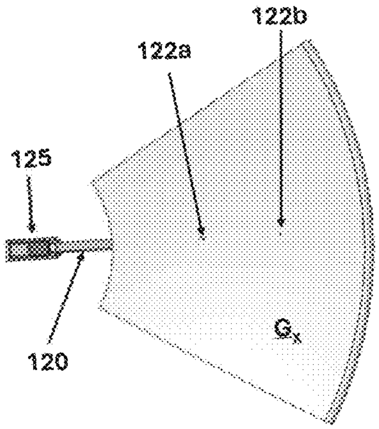
FIGS. 4*a*, 4*b*, 4*c*, 4*d* and 4*e* illustrate a backbone support structure of a first embodiment of the antenna reflector array.
Figure 4B:
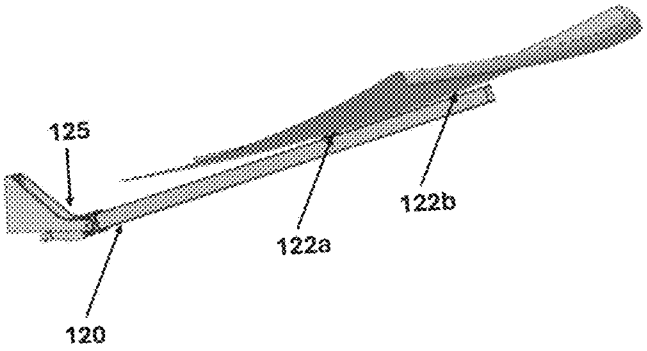
Figure 4C:
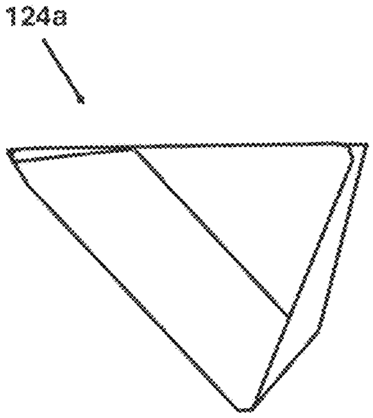
Figure 4D:
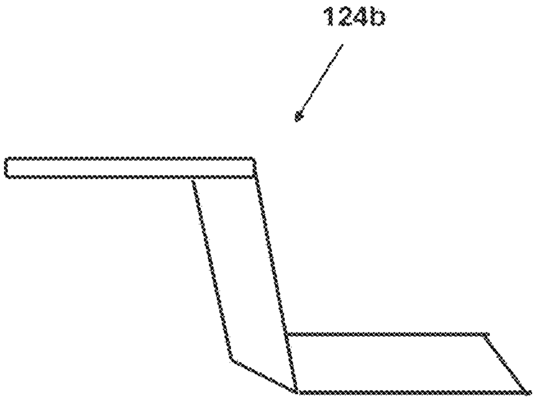

In a first embodiment of the second antenna reflector array 100, the backbone support structure includes 6 single rigid arms 120, one for each gore as shown in FIGS. 4*a* and 4*b*. In a preferred embodiment, the rigid arms are hollow, thin-walled tubes formed of high modulus composite square or rectangular tubing made from a similar composite material to the gores, e.g., carbon fiber reinforced polymer (CFRP). Each rigid arm 120 includes a connection bracket 125 facilitating hinging of the arm from the root to enable gore rotation from the stowed to the deployed configuration of the reflector. Each rigid arm 120 is attached to its respective gore at at least two connection points 122*a* and 122*b*. FIGS. 4*c* and 4*d* provide a more detailed view of the connectors 124*a* and 124*b* on the rigid arm 120 for connecting the arm to the back of the gore. While connector 124*a* is stationary, connector 124*b* is compliant, designed to have a range of motion to allow for a small degree of movement and flex of the gore with respect to the fixation location to the arm necessary for effectively folding the gore. One skilled in the art will appreciate that the number of connection points and connectors may increase in accordance with gore size and overall reflector size.

Figure 4E:
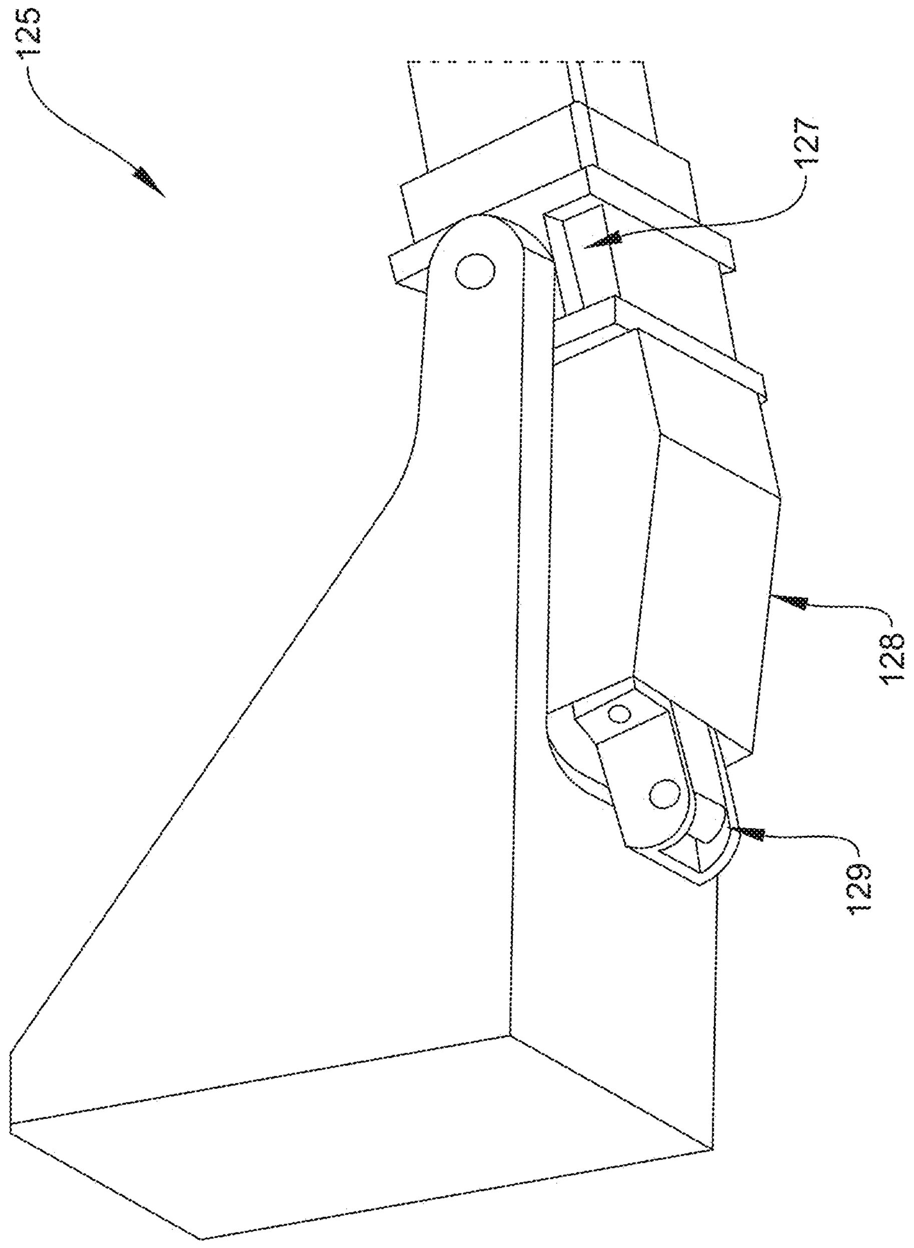

As shown in more detail in FIG. 4*e*, the connection bracket 125 includes hinge joint 127 which facilitates movement of the rigid arm 120 between stowed and deployed positions and includes a hard stop 128 for limiting angular movement and a storage/deployment latch 129.

Figure 5A:
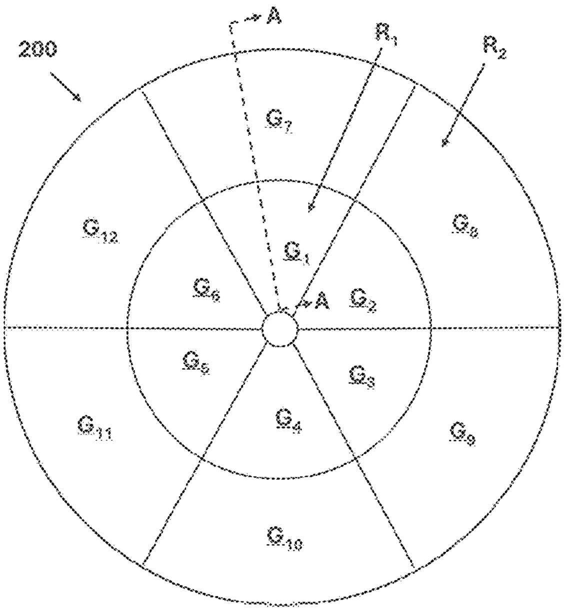
FIGS. 5*a*, 5*b* and 5*c* illustrate various views of a second connected gore antenna reflector array 200 in its fully deployed state.
Figure 5B:
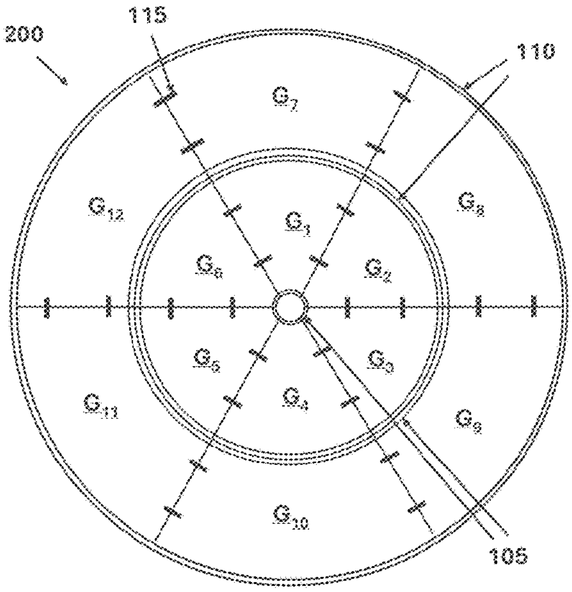
Figure 5C:
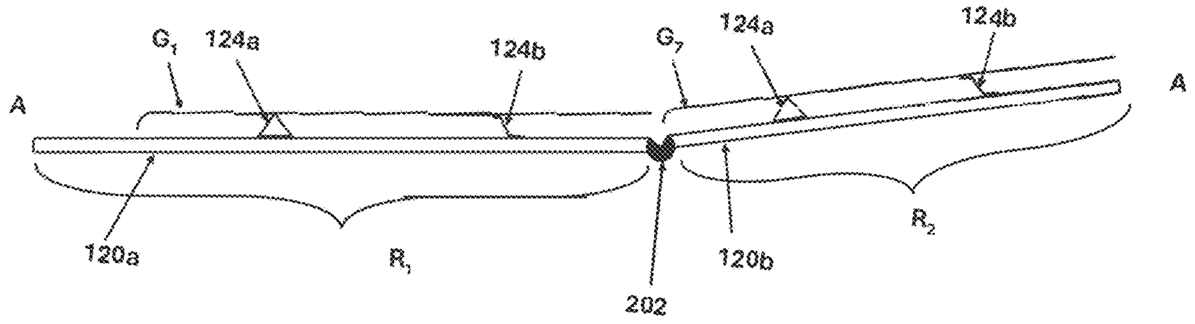

FIGS. 5*a*, 5*b* and 5*c* are exemplary drawing representations of a second antenna reflector array 200 in its fully deployed state is shown in FIGS. 5*a* (top view; reflector side) and 5*b* (bottom view; with support structure not shown) which include multiple concentric rings of gores, e.g., $R_1$ and $R_2$. $R_1$ includes six 60 degree gores $G_1$, $G_2$, $G_3$, $G_4$, $G_5$, $G_6$ and $R_2$ includes six 60 degree gores $G_7$, $G_8$, $G_9$, $G_{10}$, $G_{11}$, $G_{12}$. FIG. 5*c* is a side view of FIGS. 5*a*, 5*b* intended to illustrate how rigid arms 120*a* and 120*b* of adjacent gores between concentric gore rings $R_1$ and $R_2$ are connected by a locking hinge 202.

Figure 6A:
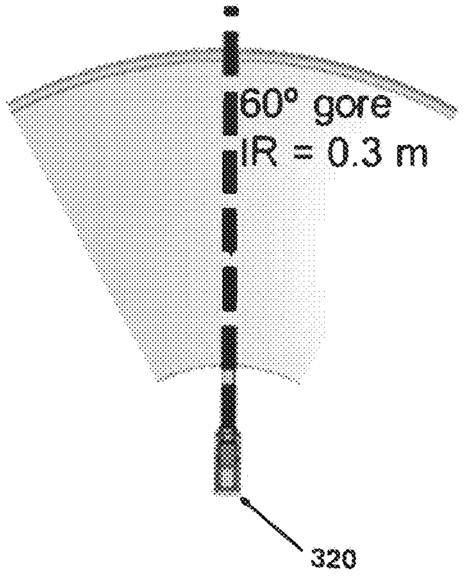
FIGS. 6*a*, 6*b*, 6*c*, 6*d* and 6*e* illustrate various views and features of a 60 degree gore which may be used in an antenna reflector array in accordance with one or more embodiments herein.
Figure 6B:
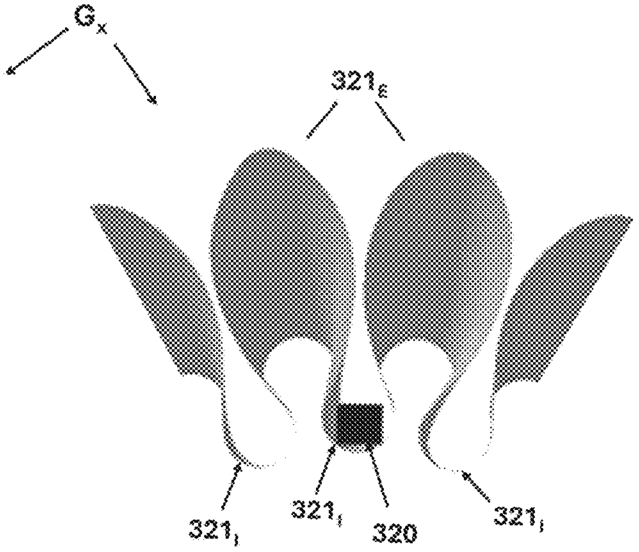
Figure 6C:
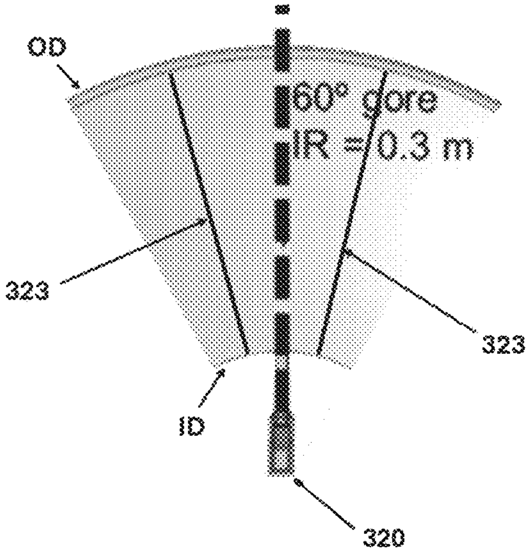
Figure 6D:
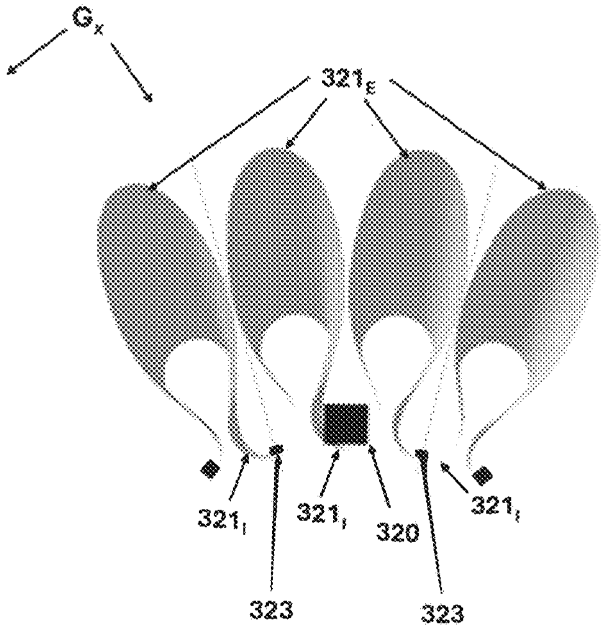
Figure 6E:
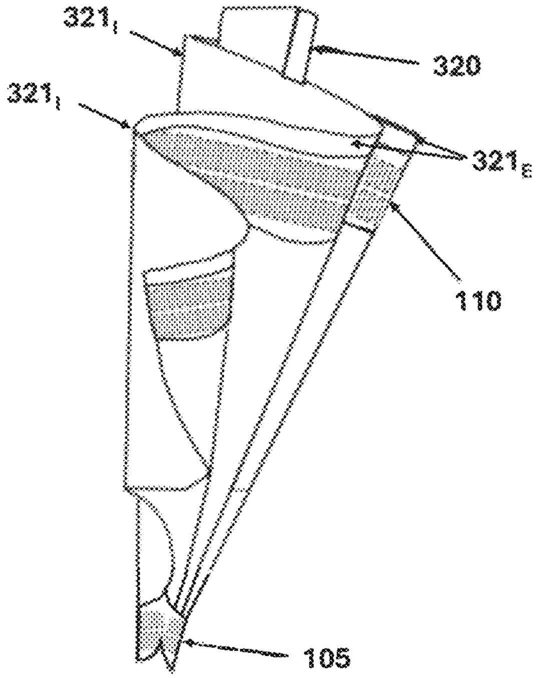

FIG. 6*a* shows a top view of an exemplary deployed 60 degree gore $G_x$ and FIG. 6*b* shows a top view of the same gore $G_x$ in an exemplary stowed position. In the exemplary stowed position, the gore's flexible composite material is in a serpentine shape having 2 full external 321E and 3 full internal lobes 3211. Other lobe configurations are contemplated and within the skill in this art. In an alternative embodiment shown in FIGS. 6*c* and 6*d*, thin strip rigid stiffeners 323 may be integrated to the backside of the gore at the locations of the gore which will define the center of certain individual inner lobes of the folded gore. Although shown in FIG. 6*c* to run the full length of the gore from outer diameter (OD) to inner diameter (ID), this may not be required. In this alternative embodiment, the gore's flexible composite material is in a serpentine shape in the stowed configuration having 4 full external 321E and 3 full internal lobes 3211. Other variations in gore design are also contemplated. FIG. 6*e* provides an isometric view of a nearly fully folded gore $G_x$ FIG. 6*b*, which also shows the inner 105 and outer 110 tape-spring skirts in their programmed state which adopts the local serpentine shape of the folded gore.

Figure 7B:
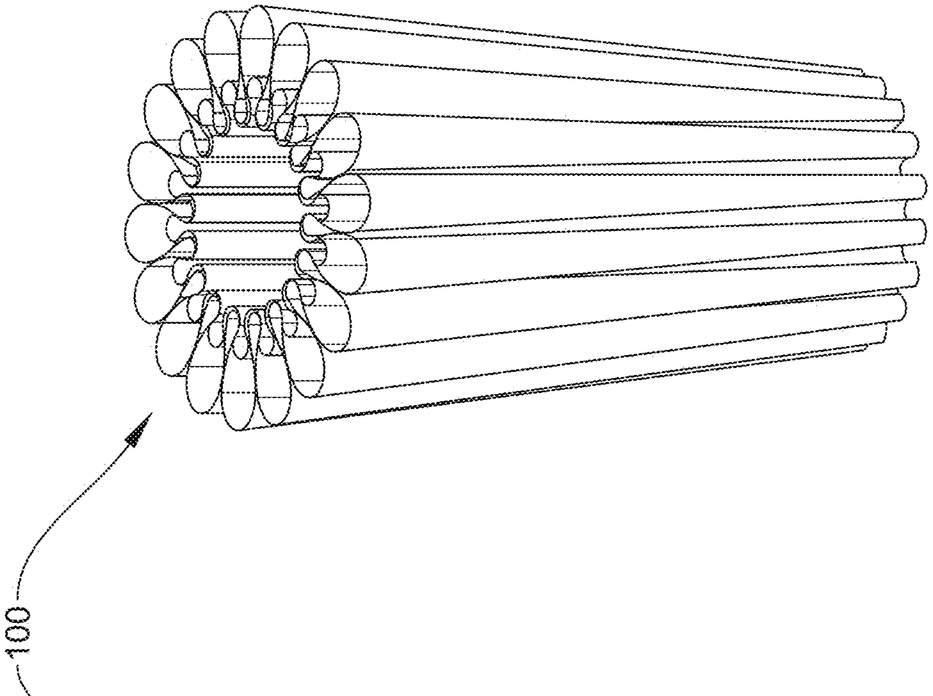
FIGS. 7*a*, 7*b*, 7*c*, 7*d*, 7*e*, 7*f*, 7*g* and 7*h* illustrate views of connected gore antenna reflector arrays having one or more gore rings in a stowed state in accordance with embodiments herein.
Figure 7A:
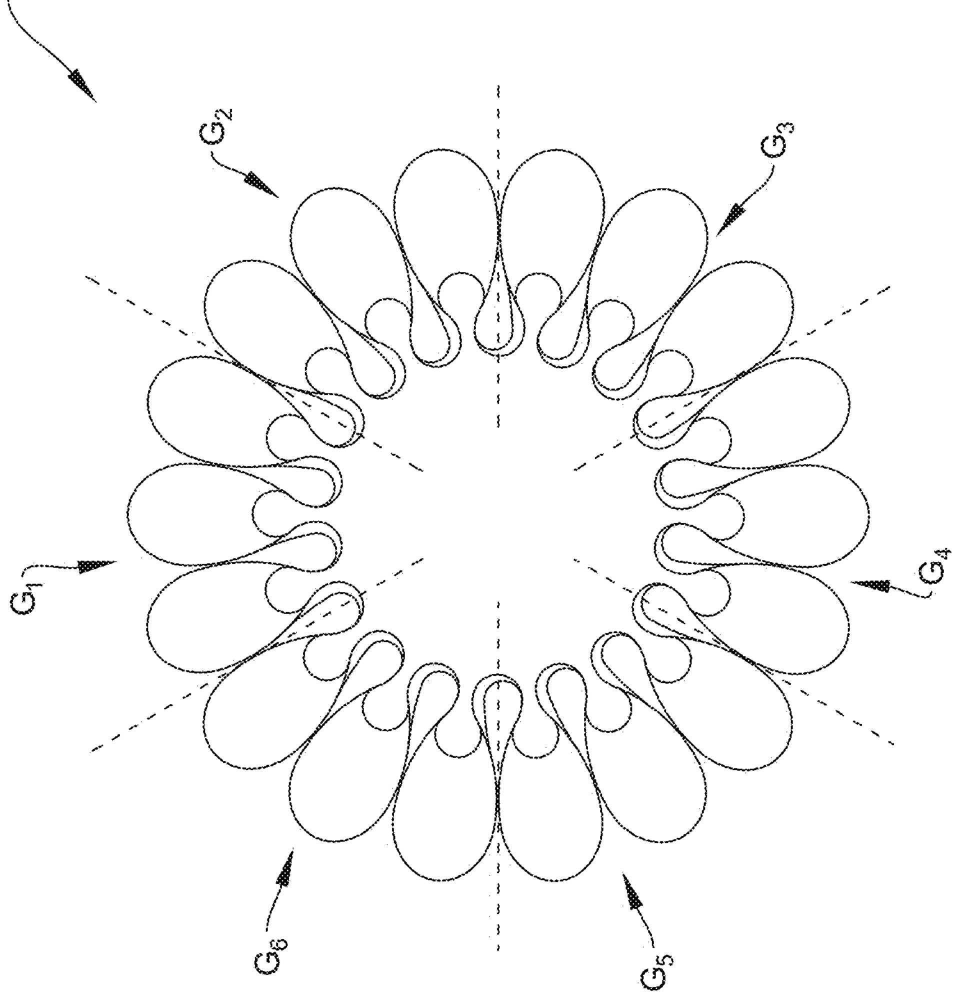
Figure 7D:
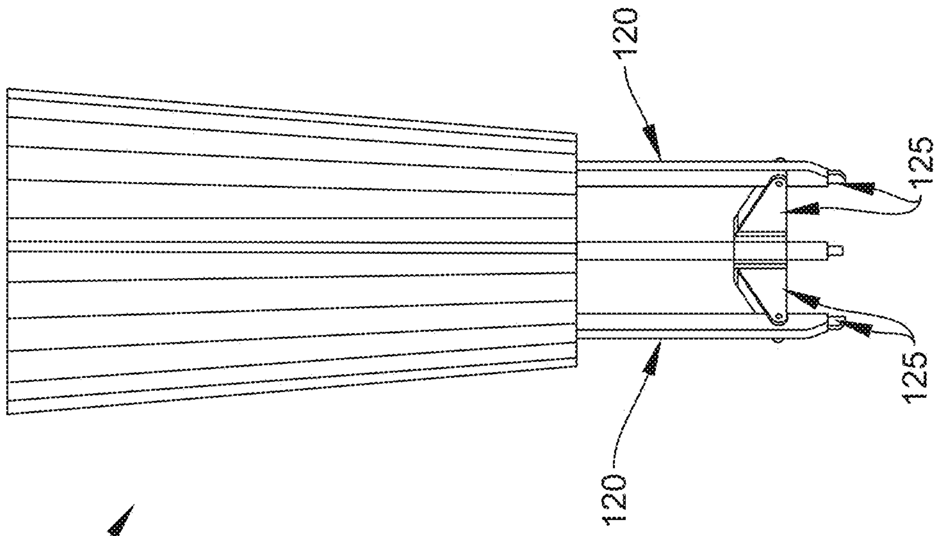
Figure 7C:
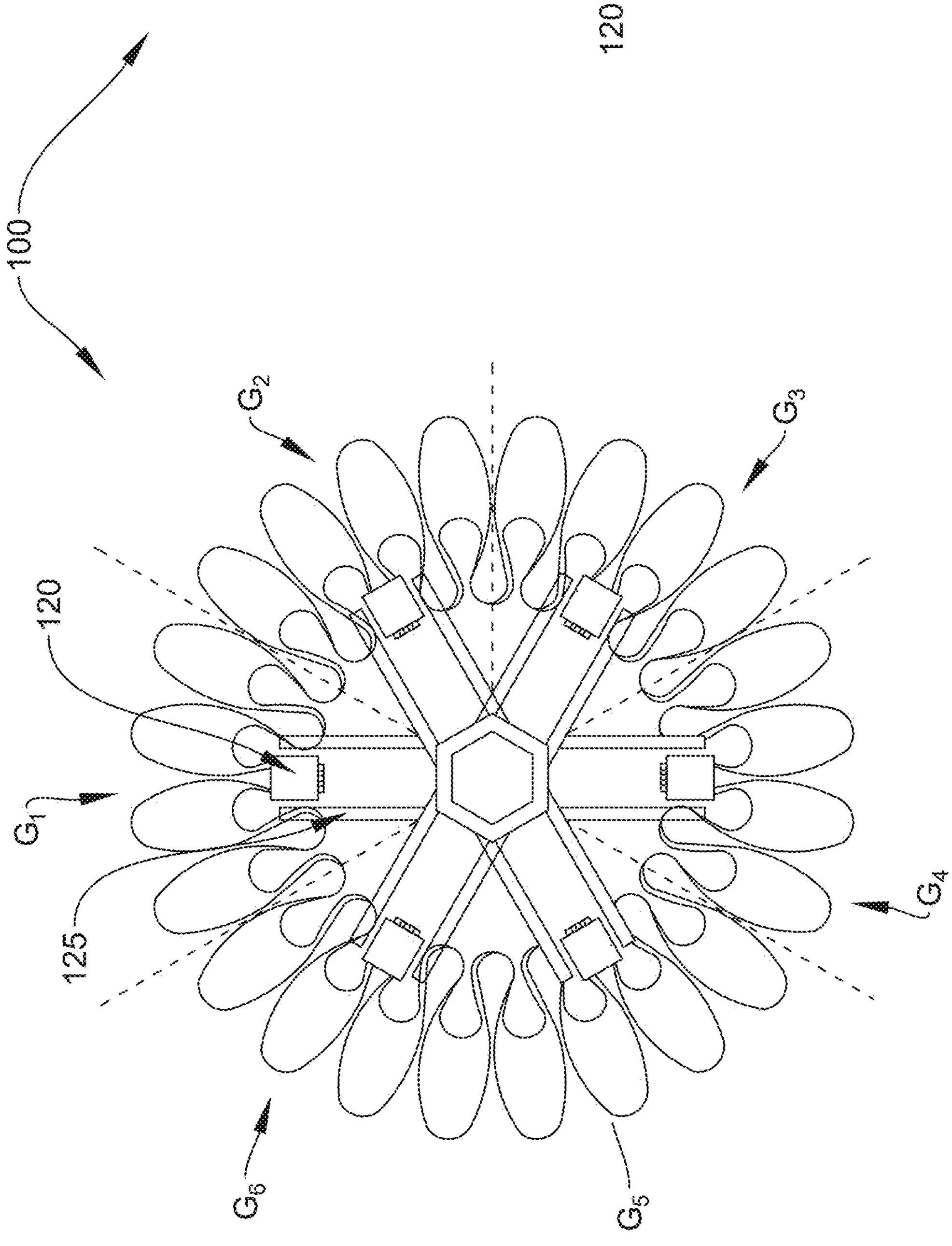

FIGS. 7*a*, 7*b*, 7*c*, 7*d*, 7*e*, 7*f*, 7*g* and 7*h* provide exemplary conceptual views of single and multiple reflector ring array configurations in their folded states. FIGS. 7*a* and 7*b* provide exemplary top (FIG. 7*a*) and isometric side (FIG. 7*b*) views of the antenna reflector array 100 in its fully stored state without backbone structure having six 60 degree gores in a different, 3 full outer lobe serpentine-folded configuration, than FIG. 6*b*. The dotted lines delineate the individual gores. FIGS. 7*c* and 7*d* provide exemplary top (FIG. 7*c*) and side (FIG. 7*d*) views of the second antenna reflector array 100 in its fully stored state with backbone structure details including connecting rods 120 with brackets 125 having 60 degree gores in the serpentine-folded configuration of FIG. 6*d*. In an exemplary embodiment, the inner diameter (ID) of a stowed 3 m antenna reflector array 100 is approximately 0.34 m, the outer diameter (OD) is approximately 0.76 m and total height (with backbone structure) is 1.60 m. These values are merely exemplary. For the outside diameter (OD) and inside diameter (ID) of the stowed state, these values can be reduced by increasing the number of waves (lobes) in the reflector. The more waves the lower the OD will be. The ID is related to both the central cutout hole and the number of waves that dictate the maximum stress/strain field of the gore material in the folded state. The stowed height is approximately equal to the outside radius of the deployed state. For multiple reflector concentric ring configurations, the same design principle is used for the stowed height for each individual concentric ring, so the total height of the reflector is equal to that of the difference between outside and inside radius of each reflector ring, plus the central hole radius of the innermost ring.

Figure 7F:
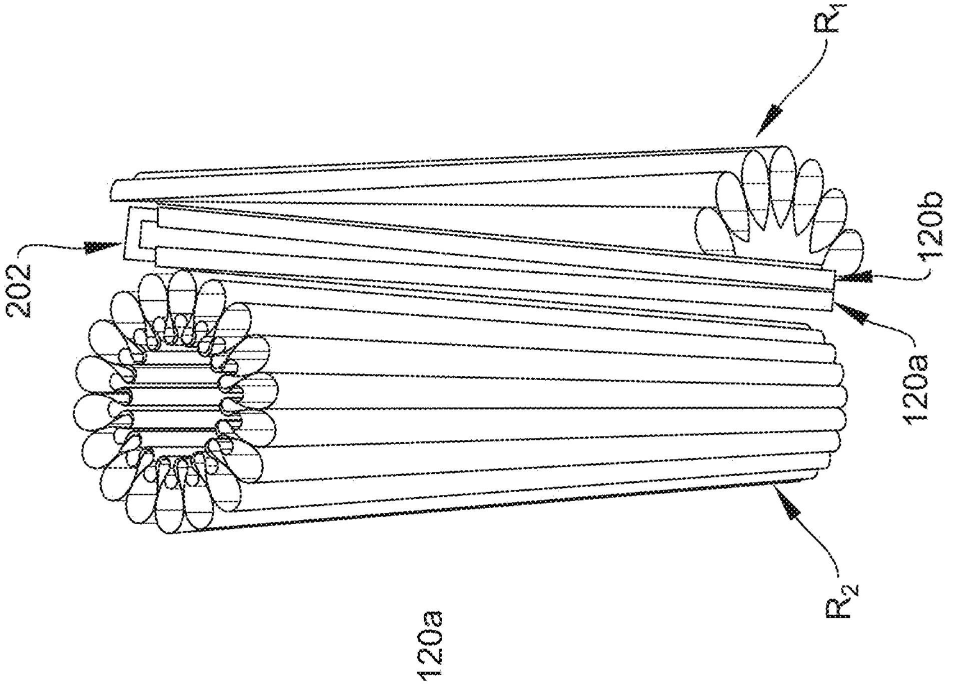
Figure 7E:
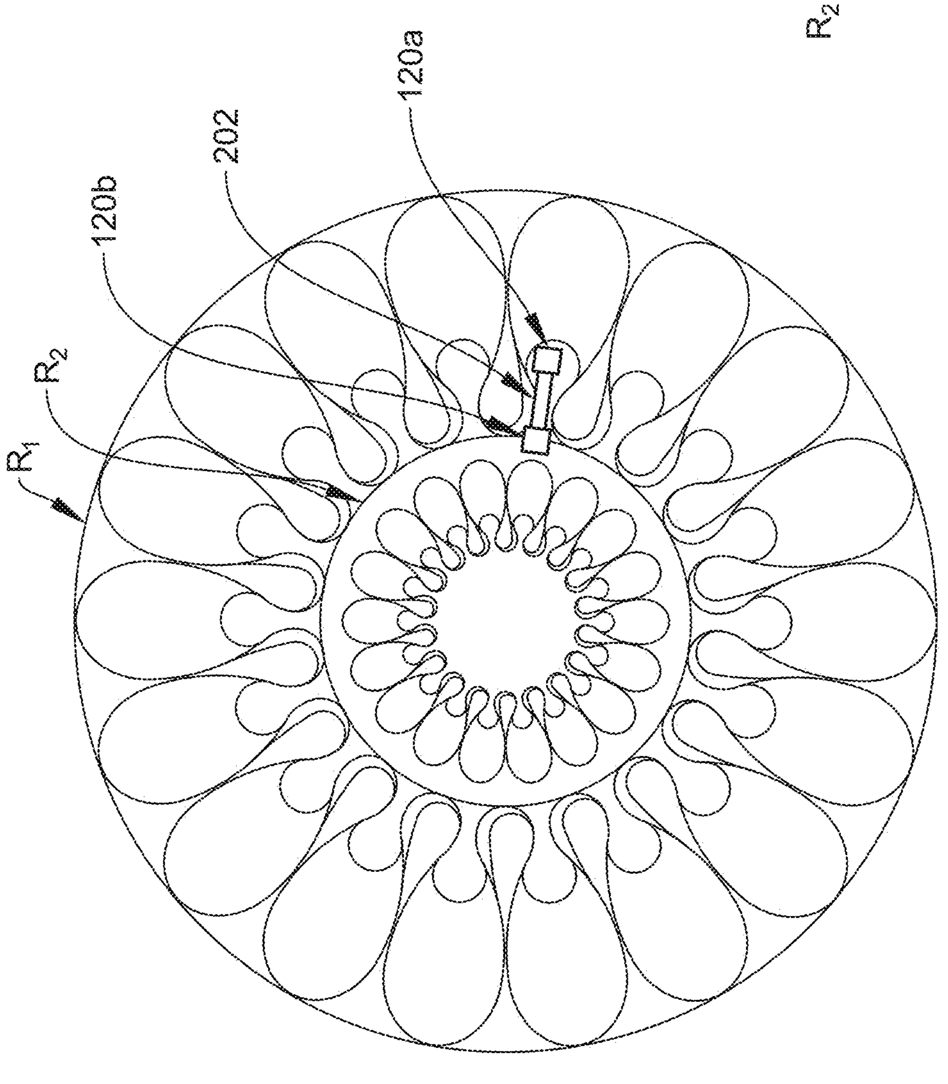

FIGS. 7*e* and 7*f* are views of the double reflector ring array configuration of 200 in its folded state. Rigid arms 120*a* and 120*b* of adjacent gores between gore rings $R_1$ and $R_2$ are connected by a locking hinge 202. Although not shown in the FIGS., rigid arm 120*a* includes a connection bracket with second hinge such as that shown and described with respect to FIG. 4*e*.

Figure 7H:
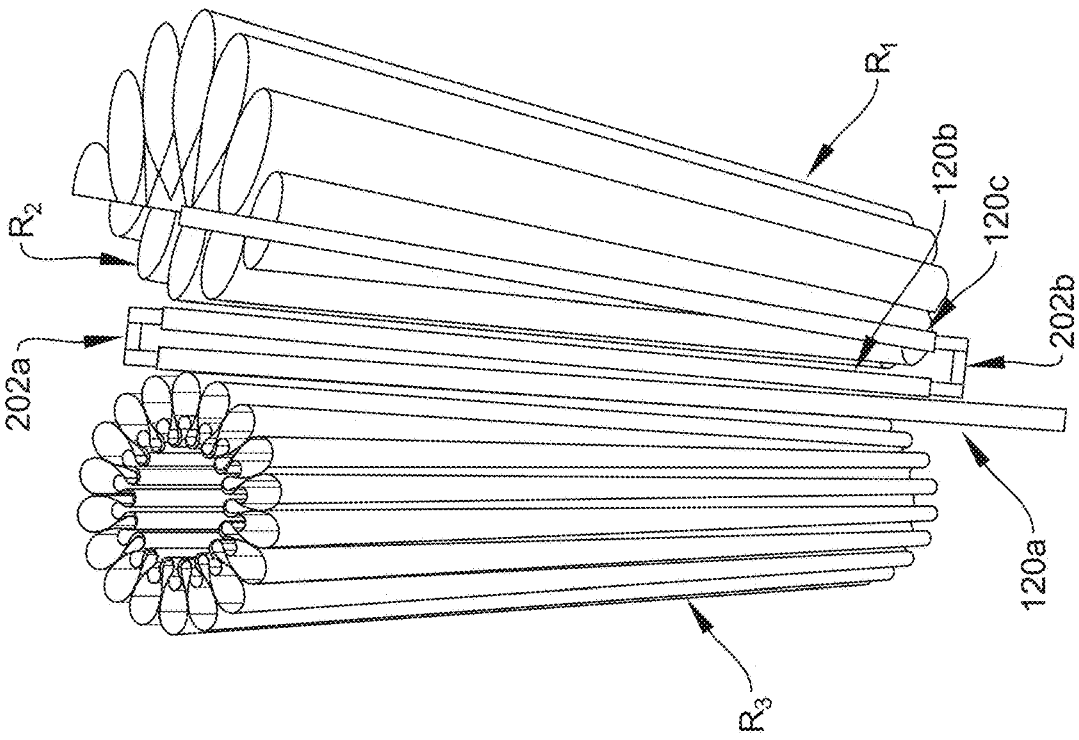
Figure 7G:
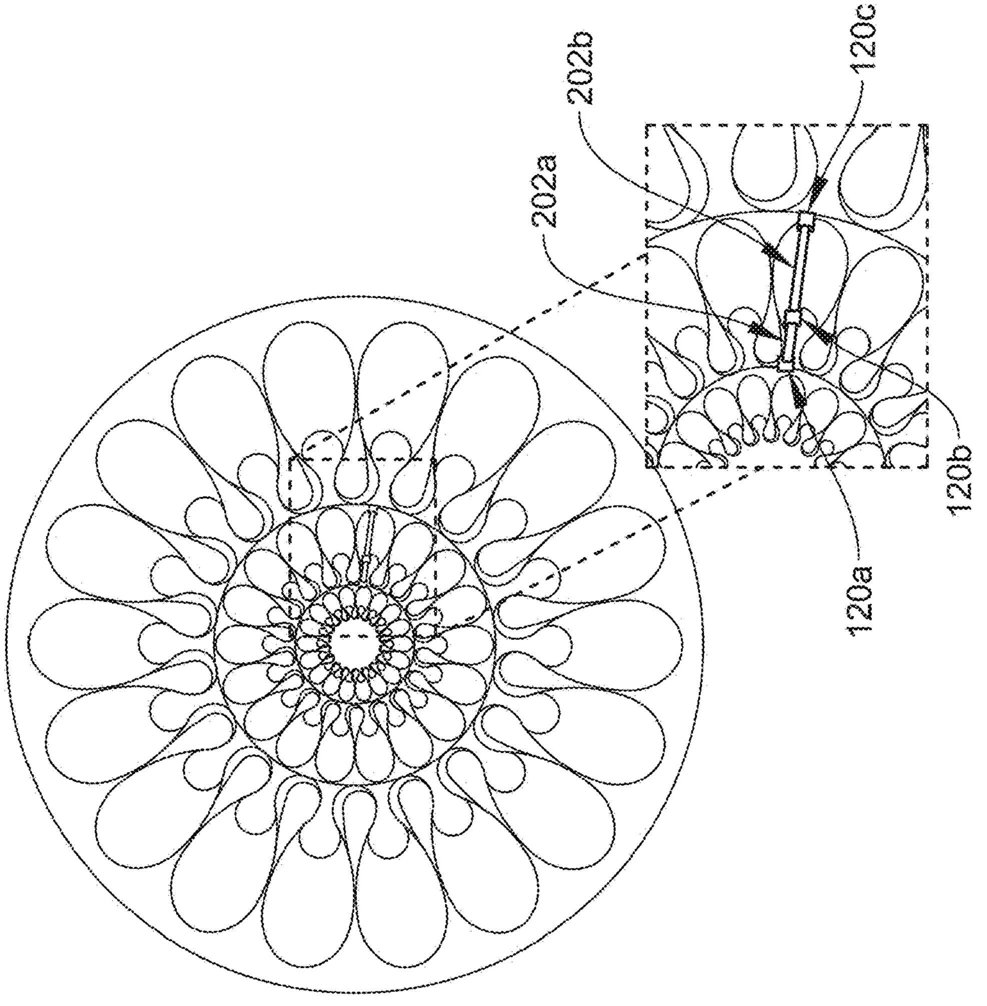

FIGS. 7*g* and 7*h* are views of triple reflector ring array configuration of in its folded state. Rigid arms 120*a*, 120*c* and 120*b* of adjacent gores between gore rings $R_1$, $R_2$ and $R_3$ are connected by a locking hinges 202*a* and 202*b*. Although not shown in the FIGS., rigid arm 120*a* includes a connection bracket with second hinge such as that shown and described with respect to FIG. 4*e*.

Figure 8:
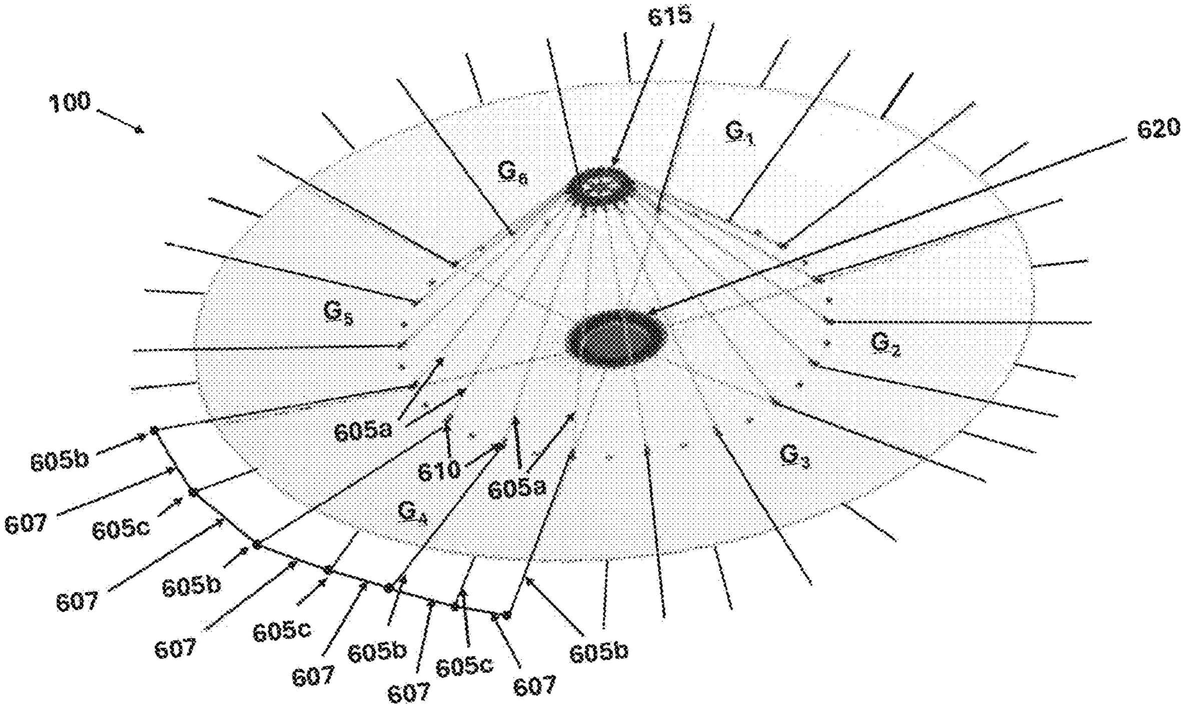
FIG. 8 illustrates a third antenna reflector array in its fully deployed state in accordance with one or more embodiments herein.
Figure 9:
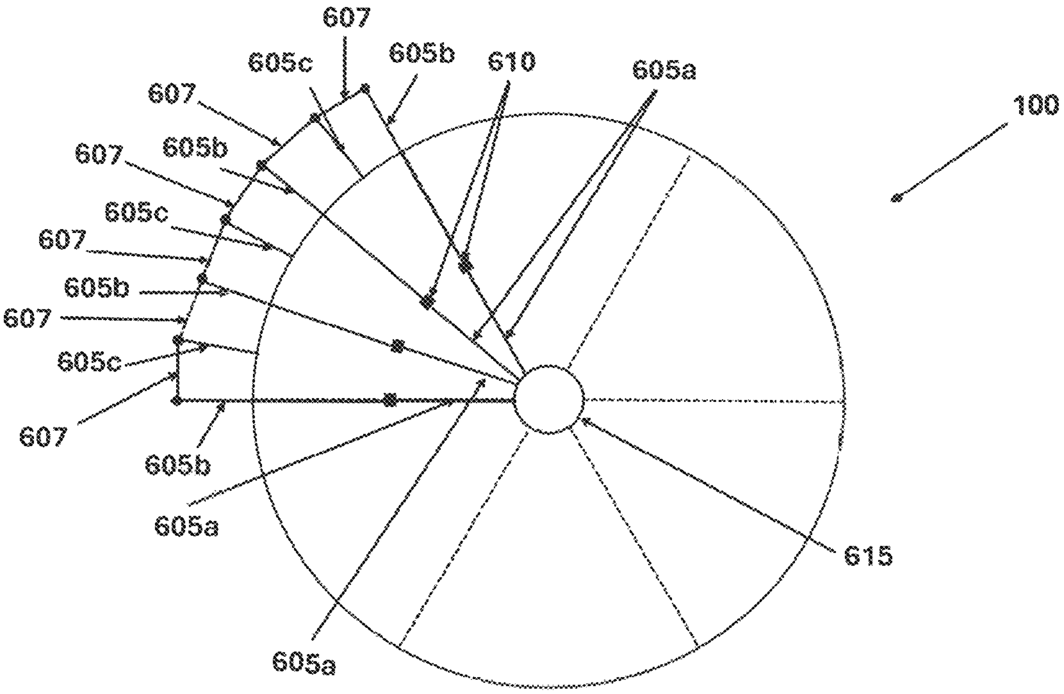
FIG. 9 illustrates a top view of the deployed third antenna reflector array including pushrods in accordance with one or more embodiments herein.
Figure 10:
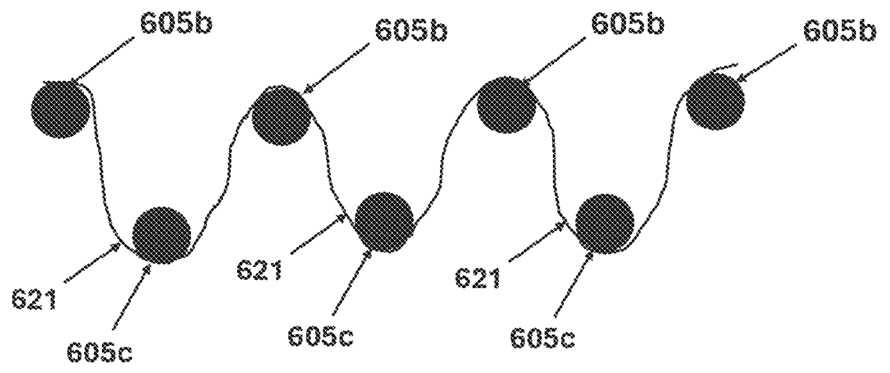
FIG. 10 shows the principle of folding operation of each gore in the third antenna reflector array in accordance with one or more embodiments herein.
Figure 11A:
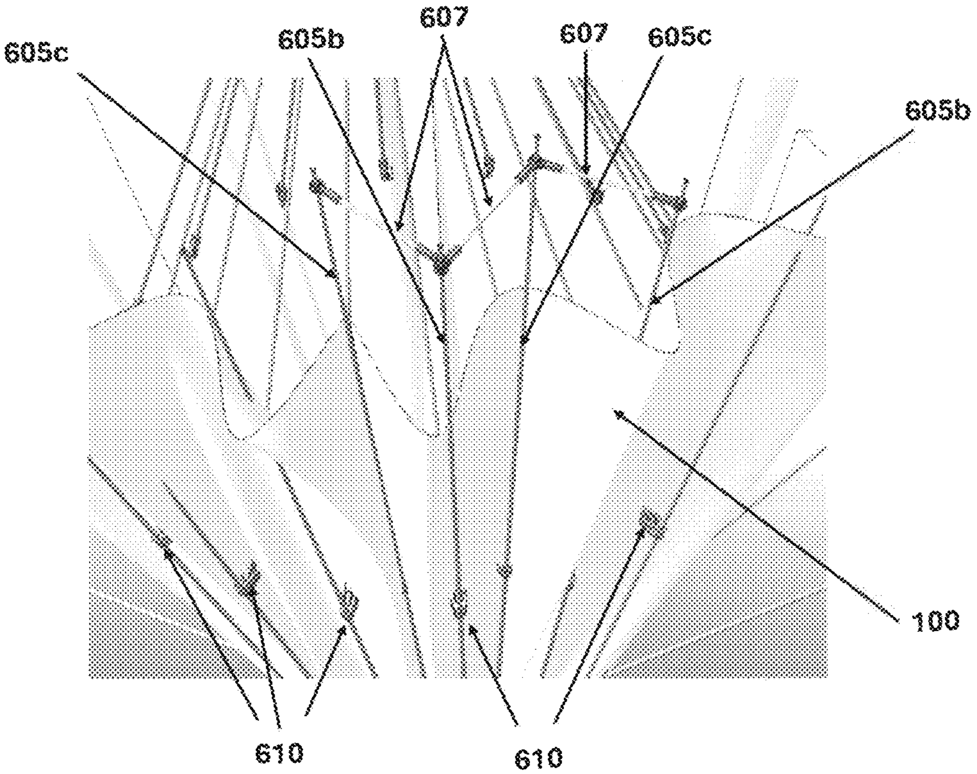
FIGS. 11*a* and 11*b* illustrate features of the pushrod configuration of the third antenna reflector array in accordance with one or more embodiments herein.
Figure 11B:
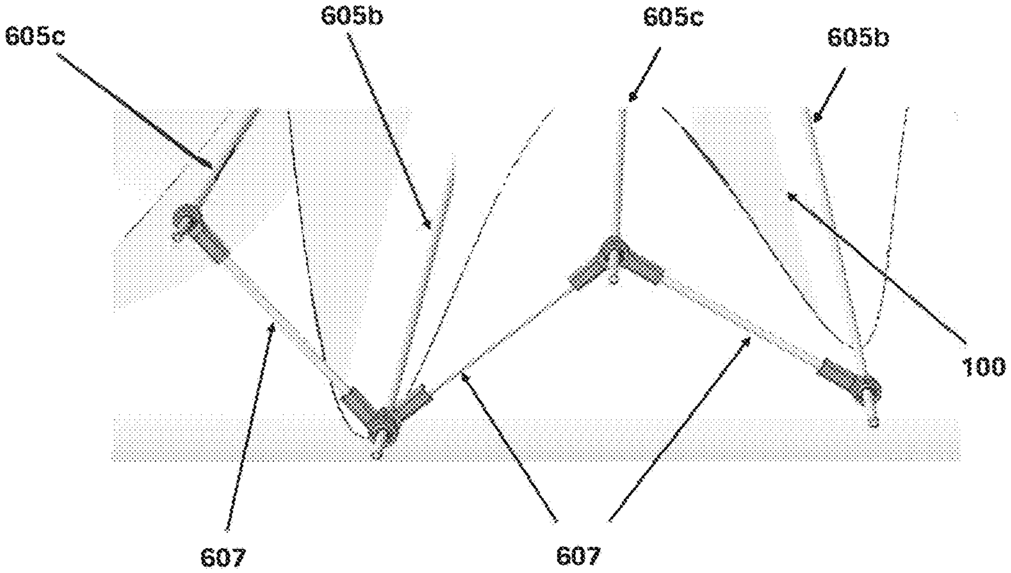

An exemplary drawing representation of antenna reflector array 100 in its fully deployed state with connected Ground Support Equipment (GSE) is shown in FIG. 8. This embodiment includes a packaging scheme comprising a series of connected pushrods 605*a* connected to a first central top hub 615 at a first end thereof and to a counterpart pushrod 605*b* at a second end thereof by mechanical hinges 610. The counterpart pushrods 605*b* are connected to a second central hub 620 at a first end thereof and to pushrods 605*c* by synchronization links 607. Pushrods 605*c* are also connected to second stationary bottom central hub 620 and to counterpart pushrods 605*b*. The combination of connected pushrods operates to fold and unfold the connected gores like an umbrella. The antenna reflector array 100 includes a connected gore configuration such as that shown in FIGS. 1*a* and 1*b*. FIG. 9 is a top view of the antenna reflector array 100 in a fully deployed state with GSE shown with respect to a single gore. The dotted lines delineate each gore. FIG. 10 shows the principle of folding operation for each gore in the array. Each gore is folded into a 3-lobe 621 configuration using seven pushrods. Accordingly, the GSE has two sets of pushrods in contact with the reflector surface, which work in tandem to create opposing forces on the thin-shell reflector to create the folds FIGS. 11*a* and 11*b* illustrate features of the pushrod configuration, including rod connectors 610 for connecting pushrods 605*a* with 605*b* and synchronization links 607 for connecting 605*b* with 605*c* having ball rod ends to allow for angular misalignment as the links z-fold during reflector stowage.

Figure 12A:
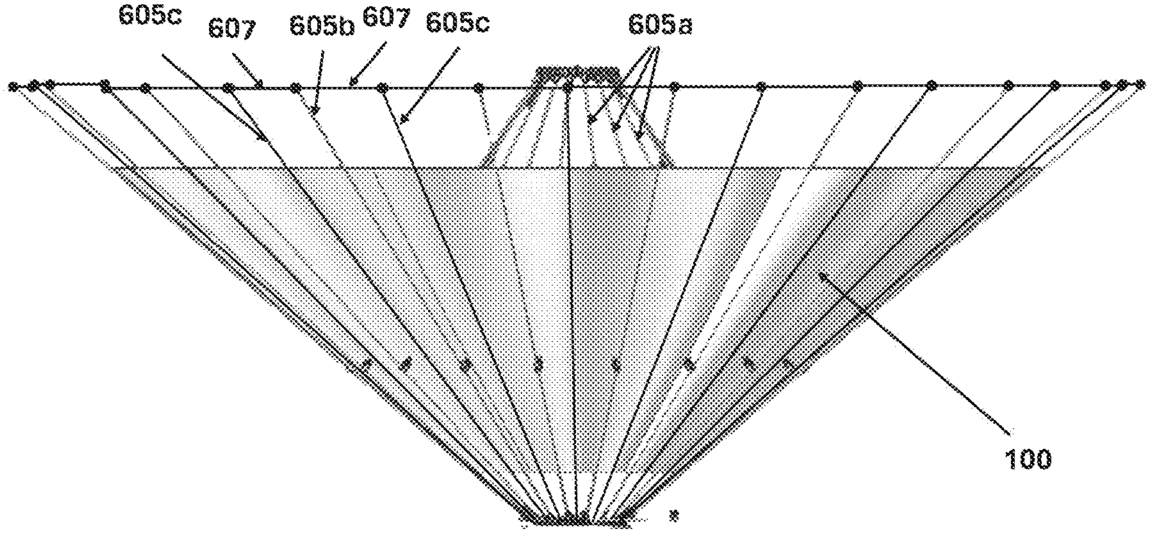
FIGS. 12*a* and 12*b* illustrate antenna reflector array GSE with (FIG. 12*a*) and without (FIG. 12*b*) the connected gores at 40-degree Fold angle.
Figure 12B:
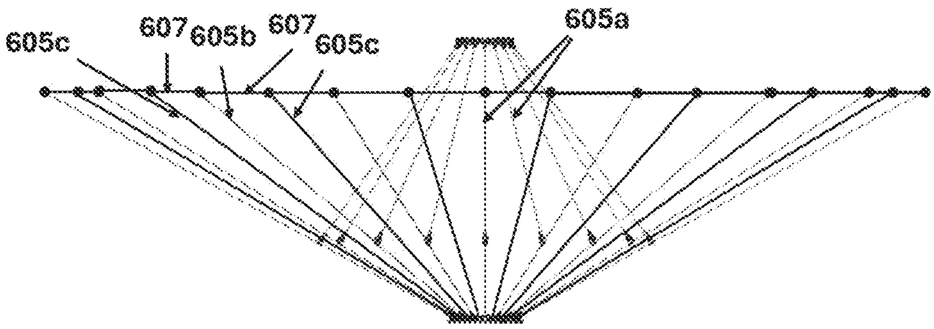
Figure 13A:
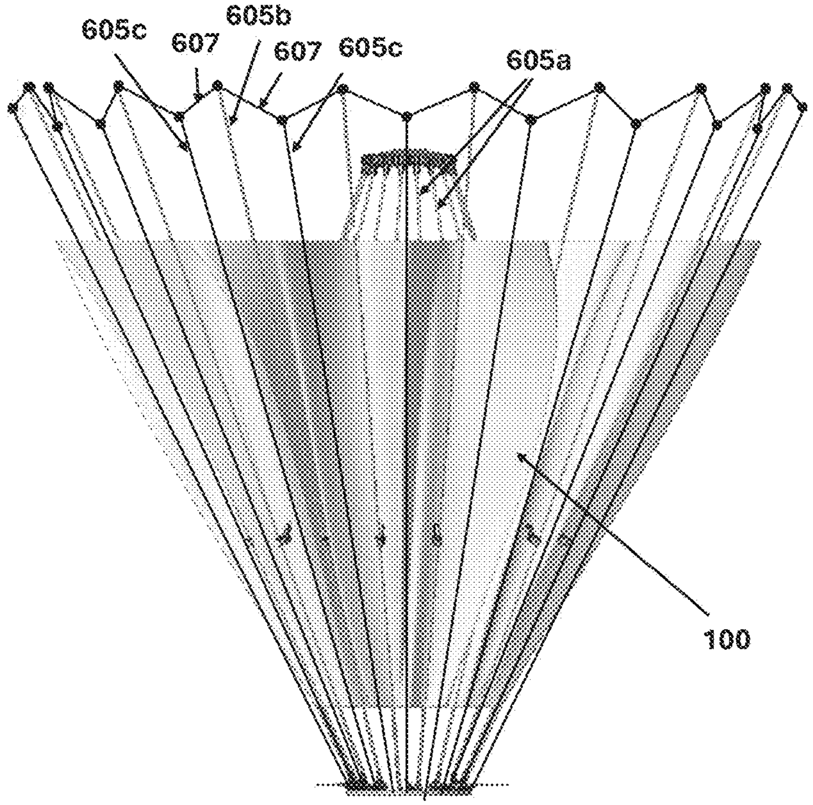
FIGS. 13*a* and 13*b* illustrate antenna reflector array GSE with (FIG. 13*a*) and without (FIG. 13*b*) the connected gores at 65-degree Fold angle.
Figure 13B:
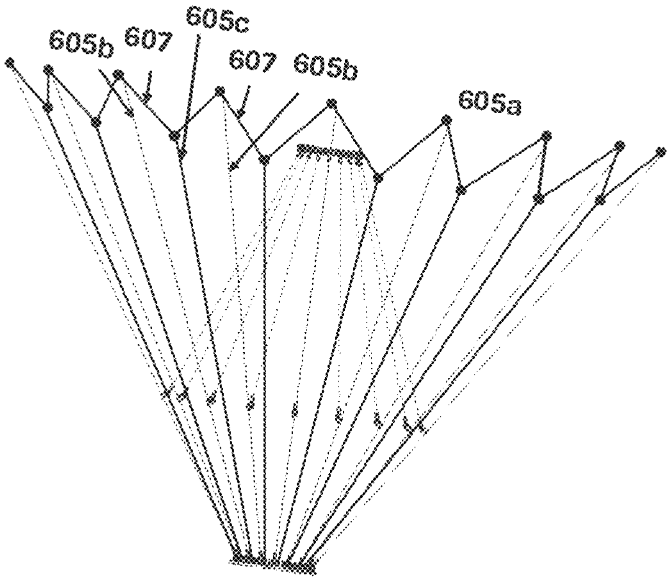
Figure 14C:
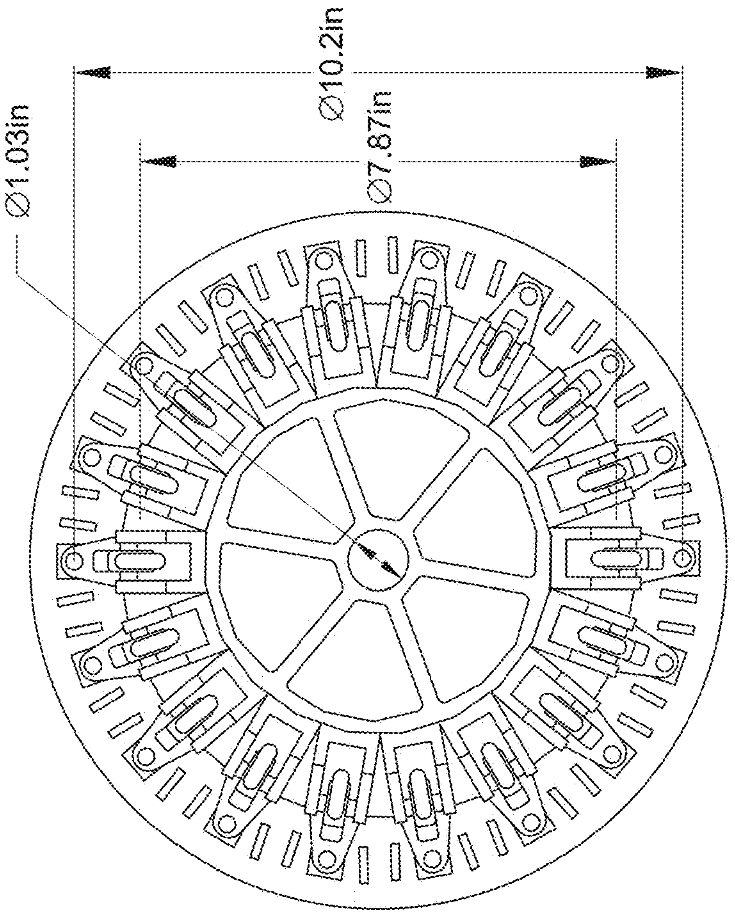
FIGS. 14*a*, 14*b* and 14*c* illustrate third antenna reflector array GSE in fully folded state.
Figure 14B:
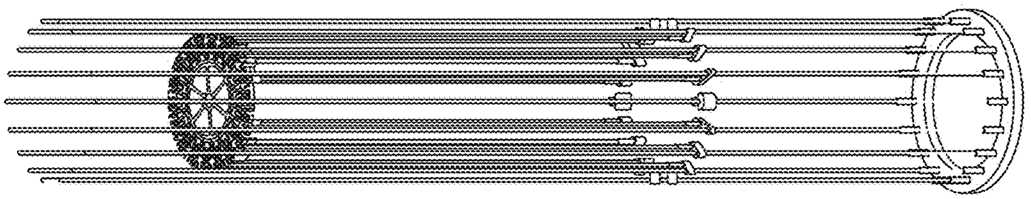
Figure 14A:
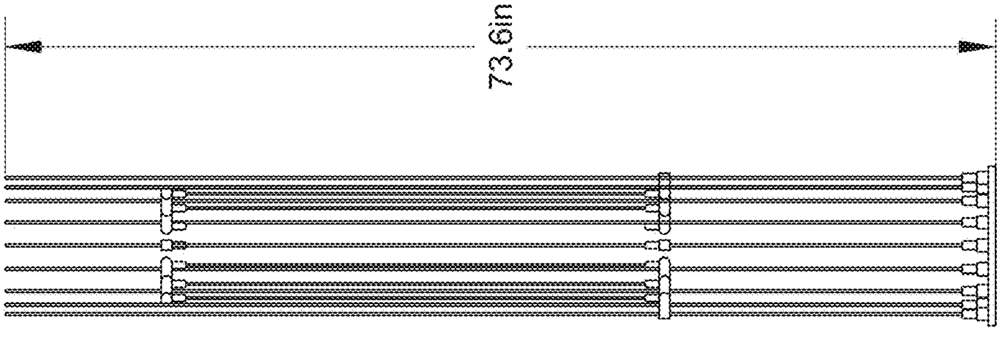

FIGS. 12*a* and 12*b* illustrate the second antenna reflector array GSE with (FIG. 12*a*) and without (FIG. 12*b*) the connected gores at a 40 degree Fold angle. FIGS. 13*a* and 13*b* illustrate the second antenna reflector array GSE with (FIG. 13*a*) and without (FIG. 13*b*) the connected gores at a 65 degree Fold angle. FIGS. 14*a*, 14*b* and 14*c* illustrate various views of the GSE in fully folded (stowed) configuration (without the connected gores). These FIGS. show the various positions of pushrods 605*a*, 605*b* and 605*c*.

FIGS. 15*a*, 15*b*, 15*c*, 15*d*, 15*e*, 15*f*, 15*g*, and 15*h* illustrate the first antenna reflector array 100 at various stages of deployment using two exemplary circular bands or loops, 701*a* and 701*b*, restraining the outer lobes of the serpentine folded stowed reflector. The 701*a* restraining element is placed near the inner diameter of the reflector and the 701*b* element is placed near the outer diameter of the reflector. A different number and location of the restraining bands/loops is possible depending on the reflector size. FIGS. 15*a*, 15*c*, 15*e* and 15*g* show the top view of the reflector at the start (completely folded), 65-degree Fold angle, 40-degree Fold angle, and 0-degree Fold angle (i.e., completely deployed). FIGS. 15*b*, 15*d*, 15*f* and 15*h* show the side view of the reflector at the start (completely folded), 65-degree Fold angle, 40-degree Fold angle, and 0-degree Fold angle (i.e., completely deployed). The diameter of the 701*a* and 701*b* bands/loops is progressively increased by a secondary reeling mechanism, which in return allows the folded reflector surface to extend towards the deployed position by the rotation of the multiple rigid radial arm elements 120 hinged on brackets 125 to which the multiple connected gores are attached.

The deployment process of the reflector can occur via the following methods or combination thereof: 1) by the radial arm hinge connectors 125 affixed to the central hub being mechanically actuated synchronously, by for example a deployment motor; 2) by the radial arm hinge connectors 125 affixed to the central hub being passively rotated by moments created about their hinge joints 127 by the multiple connected gore surface folded in a serpentine pattern, releasing the strain energy stored in the elastic thin-shell material during the stowed process; 3) by at least one or more circular bands or loops constraining the outer diameter of the stowed reflector being panned out by a reeling mechanism that controls the rate of reflector deployment by progressively increasing the diameter of the bands or loops; 4) by the SMC substrate components post-bonded to the elastic reflective surface (skirts and gore-to-gore connectors) actuating between a second programmed shape and a first original shape.

Additional details supporting features of one or more embodiments herein may be found in the conference manuscript to Juan M. Fernandez et al., SEGMENTED, PLEAT-FOLDED AND RIB-SUPPORTED THIN-SHELL COMPOSITE ANTENNA REFLECTOR, $41^{st}$ ESA Antenna Workshop on Large Deployable Antennas, 25-28 Sep. 2023 at ESA-ESTEC in Noordwijk, The Netherlands, the contents of which is incorporated herein by reference in its entirety.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the features of the embodiments and does not pose a limitation on the scope of the embodiments unless otherwise claimed. No language in the specification should be construed as indicating any non-claimed element as essential to the practice of the embodiments.

Preferred embodiments are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, these embodiments includes all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

What is claimed is:

1. An antenna reflector array having at least a deployed position and a stowed position, the array comprising:

a thin-shell elastic surface including multiple flexible radial gores discretely connected circumferentially to form a surface of revolution reflective surface on a first side thereof in the deployed position, wherein each of the multiple flexible gores is connected to two other of the multiple flexible gores at edges thereof by two or more thin-shell gore-to-gore connectors, further wherein the gore-to-gore connectors are located on a non-reflective side of each flexible gore;

a backbone structure comprising multiple rigid arms for supporting the multiple connected, flexible gores, wherein each of the multiple flexible gores is attached to one of the multiple rigid arms on a non-reflective side thereof by discrete flexible connectors; and a deployment mechanism for changing the array between the deployed and stowed positions, the deployment mechanism including multiple rigid arms and a central circular hub, each of the multiple rigid arms including a hinge at one end thereof, the hinge being further connected to the central circular hub;

wherein in the stowed position, each of the multiple flexible gores assumes a serpentine shape having at least one or more lobes.

2. The antenna reflector array of claim 1, where each of the multiple flexible gores includes doubly curved circumferential stiffeners as an inner skirt portion and an outer skirt portion formed of a thin composite material with a longitudinal curvature matching an inner and outer perimeter of the surface of revolution in a deployed position and a transverse curvature providing out-of-plane stiffness.

3. The antenna reflector array of claim 2, wherein the thin composite material is a shape memory composite ("SMC") substrate and further wherein a shape of the inner skirt portion and outer skirt portion is controllable by an external stimulus between a first shape and a second shape, wherein the external stimulus is selected from the group consisting of mechanical load, heat, electrical field or magnetic field.

4. The antenna reflector array of claim 3, wherein the external stimulus is heat and further wherein each of the inner skirt portion and outer skirt portion include at least one controllable heater.

5. The antenna reflector array of claim 1, wherein each of the two or more gore-to-gore tabs is formed of a thin composite material and further wherein each of the one or more gore-to-gore connectors is controllable by an external stimulus between a first shape and a second shape, wherein the external stimulus is selected from the group consisting of mechanical load, heat, electrical field or magnetic field.

6. The antenna reflector array of claim 5, wherein a first shape of each of the one or more gore-to-gore connectors is selected from the group consisting of: a doubly curved shape wherein a longitudinal curvature matches a perimeter of the surface of revolution at its radial location in a deployed position and a transverse curvature providing out-of-plane stiffness; a single curved shape having either longitudinal or transverse curvature; and a flat shape.

7. The antenna reflector array of claim 5, wherein the thin composite material is a shape memory composite ("SMC") substrate and each of the one or more gore-to-gore connectors includes at least one controllable heater to apply heat as the external stimulus.

8. The antenna reflector array of claim 1, wherein the multiple rigid arm hinges connected to the central hub are conFIG.d to be mechanically actuated synchronously.

9. The antenna reflector array of claim 1, wherein multiple rigid arm hinges connected to the central hub are passive and the deployed position is achieved by stored strain energy in the serpentine shape from the stowed position.

10. The antenna reflector array of claim 1, wherein at least one circular band or loop constrains the outer diameter of the reflector array in the stowed position, and further wherein the at least one circular band or loop controls a rate of deployment of the reflector array to the deployed position, wherein for two or more circular bands or loops, the rate of deployment is controlled by progressively increasing the diameter of two or more circular bands or loops.

11. The antenna reflector array of claim 2, wherein the inner skirt portion, the outer skirt portion and the gore-to-gore connectors assist in achieving the deployed position of the reflector array when actuated between a first shape and a second shape.

12. The antenna reflector array of claim 1, wherein each of the multiple flexible gores is comprised of an elastic thin-ply carbon fiber reinforced polymer (CFRP) laminate.

13. An antenna reflector array having at least a deployed position and a stowed position, the array comprising:

a thin-shell elastic surface including multiple flexible radial gores discretely connected circumferentially to form a surface of revolution reflective surface on a first side thereof in the deployed position, wherein the surface is formed of two separate concentric gore rings comprised of multiple flexible connected gores and further wherein a first gore ring has a first inner circumference and a first outer circumference and a second gore ring has a second inner circumference and second outer circumference and further wherein the first inner circumference is the smallest circumference of the surface of revolution reflective surface and the second outer circumference is the largest circumference of the surface of revolution reflective surface;

a deployment mechanism for changing the array between the deployed and stowed positions, the deployment mechanism including multiple first rigid arms, multiple second rigid arms and a central circular hub; and a backbone structure for supporting the multiple connected, flexible gores in each gore ring, wherein each of the multiple flexible gores in the first gore ring is attached to one of the multiple first rigid arms on a non-reflective side thereof by discrete flexible connectors, each of the multiple first rigid arms including a first hinge at a first end thereof, the first hinge being further connected to the central circular hub and a second hinge at a second end thereof, and further wherein each of the multiple flexible gores in the second gore ring is attached to one of the multiple second rigid arms on a non-reflective side thereof by discrete flexible connectors, each of the multiple second rigid arms being further connected to the second hinge of one of the multiple first rigid arms of a flexible gore in the first gore ring;

wherein in the stowed position, each of the multiple flexible gores assumes a serpentine shape having at least one or more lobes.

14. The antenna reflector array of claim 13, where each of the multiple flexible gores includes a doubly-curved circumferential stiffener as an inner skirt portion and an outer skirt portion with a longitudinal curvature matching the inner and outer perimeters of the concentric ring surface of revolution in the deployed position and a transverse curvature providing out-of-plane stiffness, wherein the inner skirt portion and outer skirt portions are formed of a thin composite material and further wherein a shape of each of the inner skirt portion and outer skirt portions is controlled by an external stimulus between a first shape and a second shape, wherein the external stimulus is selected from the group consisting of mechanical load, heat, electrical field or magnetic field.

15. The antenna reflector array of claim 14, wherein the external stimulus is heat and further wherein each of the inner skirt portion and outer skirt portion include at least one controllable heater.

16. The antenna reflector array of claim 13, where each of the multiple flexible gores in the first gore ring is connected to two other of the multiple flexible gores in the first gore ring at edges thereof by two or more gore-to-gore connectors located on a non-reflective side of each flexible gore; and each of the multiple flexible gores in the second gore ring is connected to two other of the multiple flexible gores in the second gore ring at edges thereof by two or more gore-to-gore connectors located on a non-reflective side of each flexible gore.

17. The antenna reflector array of claim 13, wherein each of the two or more gore-to-gore connectors is formed of a thin composite material and further wherein each of the one or more gore-to-gore connectors is controllable by an external stimulus between a first shape and a second shape, wherein the external stimulus is selected from the group consisting of mechanical load, heat, electrical field or magnetic field, the first shape of each of the one or more gore-to-gore connectors is selected from the group consisting of: a doubly curved shape wherein a longitudinal curvature matches a perimeter of the surface of revolution at its radial location in a deployed position and a transverse curvature providing out-of-plane stiffness; a single curved shape having either longitudinal or transverse curvature; and a flat shape.

18. The antenna reflector array of claim 17, wherein the thin composite material is a shape memory composite ("SMC") substrate and each of the one or more gore-to-gore connectors includes at least one controllable heater to apply heat as the external stimulus.

19. A system for stowing a deployed antenna reflector array comprising:

a first circular central hub having multiple first pushrods connected thereto and second circular central hub having multiple second pushrods connected thereto, wherein each of the multiple first pushrods is mechanically connected to one of the multiple second pushrods;

further wherein, the first circular central hub, the multiple first push rods and the multiple second push rods are located on a reflective side of a surface of revolution reflective surface of an array of multiple connected flexible radial gores and the second circular hub is located on an opposite side of the surface of the array; and the second circular central hub further being connected to multiple third pushrods at first ends thereof, wherein each of the multiple third pushrods is connected to the multiple second pushrods by links at second ends thereof;

the first, second and third pushrods and links being capable of folding the deployed antenna array for stowing into a substantially cylindrical configuration with the multiple flexible connected gores each forming a serpentine shape with one or more lobes.

20. The system of claim 19, wherein the surface of revolution reflective surface is formed of two separate concentric gore rings comprised of multiple flexible connected gores and further wherein a first gore ring has a first inner circumference and a first outer circumference and a second gore ring has a second inner circumference and second outer circumference and further wherein the first inner circumference is the smallest circumference of the surface of revolution reflective surface and the second outer diameter is the largest diameter of the surface of revolution reflective surface.

* * * * *